United States Patent
Marsh et al.

(10) Patent No.: US 12,211,057 B2
(45) Date of Patent: *Jan. 28, 2025

(54) FUTURE TRENDS FORECASTING SYSTEM

(71) Applicant: CRG PREDICTIVE INTELLIGENCE, INC., Ormond Beach, FL (US)

(72) Inventors: Kevin Bradley Marsh, Union, KY (US); Brad Wilson, Nashville, TN (US); Robin Hanson, Nashville, TN (US)

(73) Assignee: CRG PREDICTIVE INTELLIGENCE, INC., Ormond Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,370

(22) Filed: Sep. 29, 2023

(65) Prior Publication Data

US 2024/0029090 A1 Jan. 25, 2024

Related U.S. Application Data

(63) Continuation of application No. 17/498,380, filed on Oct. 11, 2021, now Pat. No. 11,775,991, which is a
(Continued)

(51) Int. Cl.
*G06Q 30/0202* (2023.01)
*G06F 3/04847* (2022.01)
(Continued)

(52) U.S. Cl.
CPC ..... *G06Q 30/0202* (2013.01); *G06F 3/04847* (2013.01); *G06Q 40/00* (2013.01);
(Continued)

(58) Field of Classification Search
None
See application file for complete search history.

(56) References Cited

U.S. PATENT DOCUMENTS

| 4,603,232 A | 7/1986 | Kurland et al. |
| 5,124,911 A | 6/1992 | Sack |

(Continued)

FOREIGN PATENT DOCUMENTS

WO 0186532 A1 11/2001

OTHER PUBLICATIONS

Trend Feature Mining Algorithm Based on Financial Time Series (Year: 2010).*
(Continued)

*Primary Examiner* — Bruce I Ebersman
(74) *Attorney, Agent, or Firm* — Allen, Dyer, Doppelt + Gilchrist, PA

(57) ABSTRACT

Systems and methods for future trends forecasting based on prediction market probability estimates. Alternative simulated starting values for prediction markets are used in order to determine the preferred starting values for prediction markets to use in volumetric forecasting. A user interface that facilitates using prediction market probability estimates to determine future trends forecasts is described herein.

20 Claims, 38 Drawing Sheets

Related U.S. Application Data continuation of application No. 16/562,923, filed on Sep. 6, 2019, now Pat. No. 11,151,588, which is a continuation-in-part of application No. 15/352,116, filed on Nov. 15, 2016, now Pat. No. 10,430,813, and a continuation-in-part of application No. 15/218,718, filed on Jul. 25, 2016, now Pat. No. 10,825,033, and a continuation-in-part of application No. 14/963,349, filed on Dec. 9, 2015, now Pat. No. 10,410,287, which is a continuation-in-part of application No. 14/142,327, filed on Dec. 27, 2013, now abandoned, said application No. 15/218,718 is a continuation-in-part of application No. 14/142,327, filed on Dec. 27, 2013, now abandoned, said application No. 15/352,116 is a continuation of application No. 14/066,344, filed on Oct. 29, 2013, now Pat. No. 9,501,794, said application No. 14/963,349 is a continuation-in-part of application No. 14/066,344, filed on Oct. 29, 2013, now Pat. No. 9,501,794, which is a continuation of application No. 13/278,424, filed on Oct. 21, 2011, now Pat. No. 8,612,331.

(60) Provisional application No. 61/746,825, filed on Dec. 28, 2012, provisional application No. 61/405,352, filed on Oct. 21, 2010.

(51) Int. Cl.

| | | |
|---|---|---|
| G06Q 40/00 | (2023.01) | |
| G06Q 40/04 | (2012.01) | |
| G06Q 40/06 | (2012.01) | |
| G06F 3/04842 | (2022.01) | |
| G06Q 10/00 | (2023.01) | |
| G06Q 10/10 | (2023.01) | |
| G06Q 20/10 | (2012.01) | |
| G06Q 30/02 | (2023.01) | |
| G06Q 30/0203 | (2023.01) | |
| G06Q 40/02 | (2023.01) | |
| G06Q 40/08 | (2012.01) | |

(52) U.S. Cl.
CPC ............ *G06Q 40/04* (2013.01); *G06Q 40/06* (2013.01); *G06F 3/04842* (2013.01); *G06Q 10/00* (2013.01); *G06Q 10/10* (2013.01); *G06Q 20/10* (2013.01); *G06Q 30/02* (2013.01); *G06Q 30/0203* (2013.01); *G06Q 40/02* (2013.01); *G06Q 40/08* (2013.01)

(56) References Cited

U.S. PATENT DOCUMENTS

| | | | |
|---|---|---|---|
| 5,740,035 A | 4/1998 | Cohen et al. | |
| 5,970,467 A | 10/1999 | Alavi | |
| 5,999,918 A | 12/1999 | Williams et al. | |
| 6,012,051 A | 1/2000 | Sammon et al. | |
| 6,093,026 A | 7/2000 | Walker et al. | |
| 6,233,564 B1 | 5/2001 | Schulze | |
| 6,233,566 B1 | 5/2001 | LeVine et al. | |
| 6,260,019 B1 | 7/2001 | Courts | |
| 6,272,474 B1* | 8/2001 | Garcia ................. | G06T 11/206 705/36 R |
| 6,321,179 B1 | 11/2001 | Glance et al. | |
| 6,405,180 B2 | 6/2002 | Tilfors et al. | |
| 6,535,856 B1 | 3/2003 | Tal | |
| 6,684,190 B1 | 1/2004 | Powers et al. | |
| 6,826,541 B1 | 11/2004 | Johnston et al. | |
| 6,865,578 B2 | 3/2005 | Hays | |
| 6,912,511 B1 | 6/2005 | Eliezer et al. | |
| 6,993,495 B2 | 1/2006 | Smith et al. | |
| 6,999,987 B1 | 2/2006 | Billingsley et al. | |
| 7,120,928 B2 | 10/2006 | Sheth et al. | |
| 7,191,143 B2 | 3/2007 | Keli et al. | |
| 7,299,204 B2 | 11/2007 | Peng et al. | |
| 7,308,418 B2 | 12/2007 | Malek et al. | |
| 7,337,135 B1 | 2/2008 | Findlay et al. | |
| 7,356,498 B2 | 4/2008 | Kaminsky et al. | |
| 7,386,499 B2 | 6/2008 | Kocher | |
| 7,398,223 B2 | 7/2008 | Kahlert et al. | |
| 7,451,213 B2 | 11/2008 | Kaplan | |
| 7,509,278 B2 | 3/2009 | Jones | |
| 7,546,543 B2 | 6/2009 | Louch et al. | |
| 7,599,876 B1 | 10/2009 | Lo et al. | |
| 7,664,670 B1 | 2/2010 | Weiss | |
| 7,693,808 B2 | 4/2010 | Tingling | |
| 7,707,062 B2 | 4/2010 | Abramowicz | |
| 7,765,491 B1 | 7/2010 | Cotterill | |
| 7,827,203 B2 | 11/2010 | Keil et al. | |
| 7,835,972 B2 | 11/2010 | Almeida et al. | |
| 7,873,535 B2 | 1/2011 | Umblijs et al. | |
| 7,904,331 B2 | 3/2011 | Keil et al. | |
| 7,908,166 B2 | 3/2011 | Keil et al. | |
| 7,921,031 B2 | 4/2011 | Crysel et al. | |
| 7,958,006 B2 | 6/2011 | Keil et al. | |
| 7,970,676 B2 | 6/2011 | Feinstein | |
| 7,970,722 B1 | 6/2011 | Owen et al. | |
| 7,987,130 B2 | 7/2011 | Waldron et al. | |
| RE42,869 E | 10/2011 | Boe et al. | |
| 8,086,481 B2 | 12/2011 | Smith | |
| 8,090,614 B2 | 1/2012 | Ford et al. | |
| 8,121,891 B2 | 2/2012 | Handel et al. | |
| 8,285,632 B2 | 10/2012 | Heyman et al. | |
| 8,290,810 B2 | 10/2012 | Ramer et al. | |
| 8,306,849 B2 | 11/2012 | Graham et al. | |
| 8,321,417 B2 | 11/2012 | Davids | |
| 8,380,595 B1 | 2/2013 | Fogarty | |
| 8,396,777 B1 | 3/2013 | Fine et al. | |
| 8,448,204 B2 | 5/2013 | Johnson et al. | |
| 8,533,846 B2 | 9/2013 | Rivera | |
| 8,540,514 B2 | 9/2013 | Gosling | |
| 8,560,966 B2 | 10/2013 | Cotterill | |
| 8,583,470 B1 | 11/2013 | Fine et al. | |
| 9,679,568 B1 | 6/2017 | Taubman et al. | |
| 10,282,718 B1 | 5/2019 | Lincoln et al. | |
| 2002/0002520 A1 | 1/2002 | Gatto | |
| 2002/0013760 A1 | 1/2002 | Arora et al. | |
| 2002/0026390 A1 | 2/2002 | Ulenas et al. | |
| 2002/0049628 A1 | 4/2002 | West et al. | |
| 2002/0152110 A1 | 10/2002 | Stewart et al. | |
| 2002/0184041 A1 | 12/2002 | Muller | |
| 2003/0004858 A1 | 1/2003 | Schmitz et al. | |
| 2003/0046140 A1 | 3/2003 | Callahan et al. | |
| 2003/0050928 A1 | 3/2003 | Hays | |
| 2003/0105773 A1 | 6/2003 | Linde et al. | |
| 2003/0126010 A1 | 7/2003 | Barns-Slavin | |
| 2003/0135445 A1 | 7/2003 | Herz et al. | |
| 2003/0172019 A1 | 9/2003 | Getty | |
| 2004/0019554 A1 | 1/2004 | Merold et al. | |
| 2004/0039579 A1 | 2/2004 | Chithambaram et al. | |
| 2004/0064357 A1 | 4/2004 | Hunter et al. | |
| 2004/0064394 A1 | 4/2004 | Wallman | |
| 2005/0091146 A1* | 4/2005 | Levinson ............... | G06Q 40/04 705/37 |
| 2005/0091147 A1* | 4/2005 | Ingargiola ............ | G06Q 40/06 705/37 |
| 2005/0101381 A1 | 5/2005 | Hattori | |
| 2006/0069635 A1 | 3/2006 | Ram et al. | |
| 2006/0106743 A1 | 5/2006 | Horvitz | |
| 2006/0235786 A1* | 10/2006 | DiSalvo ................. | G06Q 40/04 705/37 |
| 2006/0271467 A1* | 11/2006 | Wasendorf ............. | G06Q 40/00 705/37 |
| 2006/0282369 A1 | 12/2006 | White | |
| 2007/0067233 A1* | 3/2007 | Dalal ..................... | G06Q 40/00 705/37 |
| 2007/0073606 A1 | 3/2007 | Lai | |
| 2007/0100722 A1 | 5/2007 | Ferguson et al. | |
| 2007/0112662 A1 | 5/2007 | Kumar | |
| 2007/0130040 A1 | 6/2007 | Stinski | |
| 2007/0208654 A1 | 9/2007 | Stearns | |

(56) References Cited

U.S. PATENT DOCUMENTS

| | | |
|---|---|---|
| 2007/0250429 A1 | 10/2007 | Walser et al. |
| 2007/0265954 A1 | 11/2007 | Mather et al. |
| 2008/0033773 A1 | 2/2008 | Brazell |
| 2008/0195459 A1 | 8/2008 | Stinski |
| 2008/0270317 A1 | 10/2008 | Waldron et al. |
| 2008/0288326 A1* | 11/2008 | Abramowicz ..... G06Q 30/0605 705/7.29 |
| 2008/0294498 A1 | 11/2008 | Adrien et al. |
| 2008/0313560 A1* | 12/2008 | Dalal ..................... G06Q 40/04 715/764 |
| 2008/0319825 A1 | 12/2008 | Lacomb et al. |
| 2009/0043623 A1 | 2/2009 | Blades et al. |
| 2009/0063359 A1 | 3/2009 | Connors |
| 2009/0076939 A1 | 3/2009 | Berg et al. |
| 2009/0076974 A1 | 3/2009 | Berg et al. |
| 2009/0089198 A1 | 4/2009 | Kroutik |
| 2009/0106084 A1 | 4/2009 | Or |
| 2009/0177553 A1 | 7/2009 | Short et al. |
| 2009/0182624 A1 | 7/2009 | Koen et al. |
| 2009/0254475 A1 | 10/2009 | Pennock et al. |
| 2009/0259597 A1 | 10/2009 | Wallman |
| 2009/0307147 A1 | 12/2009 | Ruggie |
| 2009/0327163 A1 | 12/2009 | Swan et al. |
| 2010/0004987 A1 | 1/2010 | Benschop |
| 2010/0145773 A1 | 6/2010 | Desai et al. |
| 2010/0185564 A1 | 7/2010 | King et al. |
| 2010/0217685 A1 | 8/2010 | Melcher et al. |
| 2010/0250391 A1 | 9/2010 | Yruski et al. |
| 2010/0268639 A1 | 10/2010 | Feinstein et al. |
| 2010/0324971 A1 | 12/2010 | Morsberger |
| 2011/0022307 A1 | 1/2011 | Lee |
| 2011/0087583 A1 | 4/2011 | Shrem |
| 2011/0173018 A1 | 7/2011 | Hoffner et al. |
| 2011/0251954 A1 | 10/2011 | Chin |
| 2012/0072334 A1 | 3/2012 | Feinstein et al. |
| 2012/0101933 A1 | 4/2012 | Hanson et al. |
| 2012/0166252 A1 | 6/2012 | Walker |
| 2012/0221486 A1 | 8/2012 | Leidner et al. |
| 2012/0246048 A1 | 9/2012 | Cohen et al. |
| 2013/0035981 A1 | 2/2013 | Brown et al. |
| 2013/0297485 A1 | 11/2013 | Whitney |
| 2013/0304567 A1 | 11/2013 | Adrien et al. |
| 2014/0365356 A1 | 12/2014 | Gao et al. |
| 2015/0317589 A1 | 11/2015 | Anderson et al. |
| 2016/0092989 A1 | 3/2016 | Marsh |
| 2017/0116670 A1 | 4/2017 | Carroll et al. |
| 2017/0301013 A1 | 10/2017 | Alejo et al. |
| 2020/0005341 A1 | 1/2020 | Marsh et al. |
| 2022/0028000 A1 | 1/2022 | Marsh et al. |

OTHER PUBLICATIONS

Future trend of the Shanghai stock market, IEEE (Year: 2002).*

Almenberg, J., Kittlitz, K., & Pfeiffer, T. (2009). An experiment on prediction markets in science. PLOS ONE, 4(12) doi: http://dx.doi .org/10.1371 /journal.pone.0008500 on Mar. 7, 2019 (Year: 2009).

ATD financial services receives approval to expand market making operations; automated market maker now making markets in allNMS names. (Feb. 2, 2006). Business Wire Retrieved from https://dialog.proquest.com/professional/docview/675995142?accountid=142257 on May 11, 2019 (Year: 2006).

Berg, Henry, Prediction Markets at Microsoft. Microsoft, Nov. 1, 2007.

CensusPoint.com Web Pages, Census Point, Inc., Jan. 11, 2007, Retrieved from Archive.org Nov. 23, 2015.

Consensus Point Market Profiled in Business 2.0. ConsensusPoint.com, Sep. 13, 2006.

Davidson, James Cameron, Forecasting Motion Picture Box-Office Returns and Analysis of the Hollywood Stock Exchange. Princeton University, Apr. 17, 2006.

Fuksa, M. (2002). Testing the predictability of stock returns (Order No. NQ79426). Available from ProQuest Dissertations and Theses Professional. (304788913). Retrieved from https://dialog.proquest.com/professional/ docview/304788913?accountid=131444 on May 5, 2023 (Year: 2002).

High frequency traders back market maker obligations. (2010). Wall Street Letter, , NA. Retrieved from https://dialog.proquest.com/professional/docview/1077196986?accountid= 131444 on Jun. 8, 2021 (Year: 2010).

Middlemiss, J. (2002). Users have favorites for direct-access technology (end users in action). Wall Street & Technology, 20(2),S16(3). Retrieved from http://dialog.proquest.com/professional/docview/ 678123181 ? accountid=142257 on Jul. 7, 2016.

Othman, A., Sandholm, T., Pennock, D. M., & Reeves, D. M. (2010). A practical liquidity-sensitive automated market maker doi:http://dx.doi .org/10.1145/1807342.1807 402 on May 11, 2019 (Year: 2010).

Pennock, D. M., & Sarni, R. (2007). Computational aspects of prediction markets. Algorithmic game theory (pp. 651-676)Cambridge University Press. doi:http://dx.doi.org/10.1017/ CB09780511800481.028 Retrieved from https://dialog.proquest.com/professional/docview/1915157609?accountid=142257 on May 11, 2019 (Year: 2007).

Pennock, David M., et al., The Power of Play: Efficiency and Forecast Accuracy in Web Market Games. NEC Research Institute Technical Report, Feb. 17, 2001.

Schack, J. (2000). Showdown over market structure. Institutional Investor, 34(4), 63. Retrieved from https://dialog.proquest.com/professional/docview/671073149?accountid=142257 on May 11, 2019 (Year: 2000).

Stearns, F. R. (1004). Trading system and method having a configurable market depth tool with dynamic price axis Retrievedfrom http://dialog.proquest.com/professional/docview/743633641 ?accountid=142257 on Jul. 7, 2016.

Waller, M. L. (1988). The determinants of liquidity and the role of the market-maker in commodity futures markets (Order No. 8823276). Available from ProQuest Dissertations and Theses Professional. (303569217). Retrieved from https://dialog.proquest.com/professional/docview/303569217?accountid=131444 (Year: 1988).

* cited by examiner

Figure 10

What will our margin growth be in the second quarter?

| SYMBOL_STOCK_NAME | CONSENSUS | CHANGE | VOLUME | |
|---|---|---|---|---|
| MarginGrowthQ2_0: Margin growth in Q2 will be greater than 0% but less than 10% | 46.26% $45.26 | 29.42% $69.87 | 638 | |
| MarginGrowthQ2_10: Margin growth in Q2 will be greater than 10% but less than 20% | 20.55% $29.49 | $0.00 | 251 | |
| MarginGrowthQ2_20: Margin growth in Q2 will be greater than 20% but less than 30% | 24.05% $24.05 | $0.00 | 0 | |
| MarginGrowthQ2_H: Margin growth in Q2 will be greater than 30% | 16.11% $16.11 | 19.54% $69.89 | 808 | |
| MarginGrowthQ2_L: Margin growth in Q2 will be less than 0% in Q2 | 3.06% $3.06 | 10.39% $69.29 | 263 | |

Figure 17

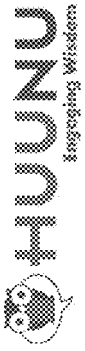
Figure 32

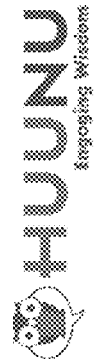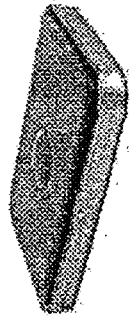
Figure 33

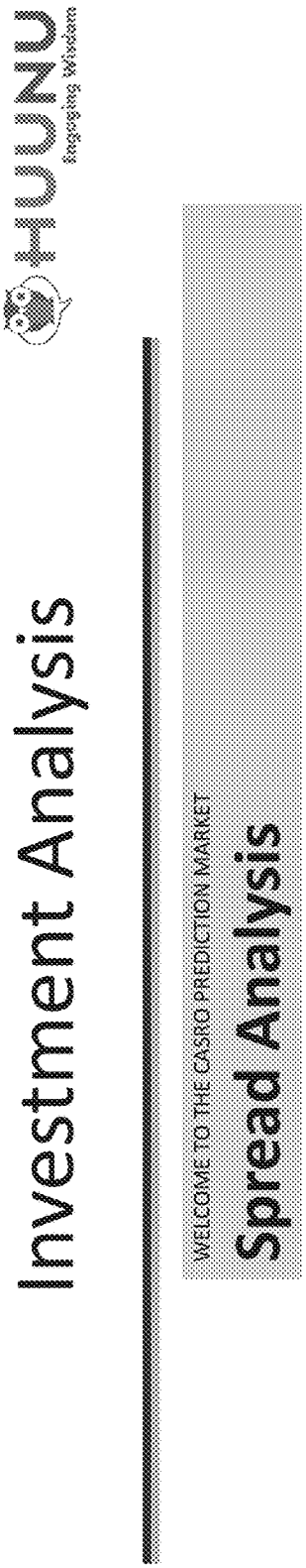
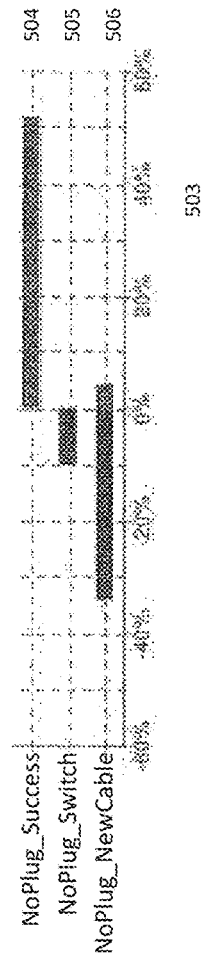
Figure 35

Participant Interface – Selecting Questions

| TOPICS | MY ANSWERS | HOW TO PLAY | FAQ | CONTACT US | | | |
|---|---|---|---|---|---|---|---|
| NoPlug_Success | NoPlug_NewCable | NoPlug_Televisions | DirectTV_CharlieSheen | DirectTV_GrandsonDogCollar | | | |
| 78.42  +3.42 | 44.92  +0.45 | 76.50  +3.75 | 60.27  +0.46 | 16.92  -0.64 | | | |

——— Sample: Concept Testing ———

Please help us evaluate a new wireless technology for TVs

| | SCORE | |
|---|---|---|
| Will people that already have televisions installed switch to NoPlug? (NoPlug_Televisions) | 76.80 +3.75 | Answer |
| Will NoPlug be ordered by more than 15% of NEW cable subscribers in the first year? (NoPlug_NewCable) | 44.92 +0.45 | Answer |
| Will NoPlug be successful in the marketplace? (NoPlug_Success) | 78.42 +3.24 | Answer |

——— Men's Mouthwash ———

Help us select a new men's personal care mouthwash product.

- Net Worth: 14,701
- My Rank: 11
- Available Points: 12,201

Sample: Concept Testing

Men's Mouthwash

Sample: Ad Testing

Sample: Forecasting

Sample: Market Preference

Tips and Tricks

Figure 36

Tracking My Answers and Performance

My Answers

Below are the amount of points you currently have invested in each question. Feel free to adjust the points in any or reclaim all your points from the question.

| TITLE (SYMBOL) | POSITION | VALUE (PROFIT) |
|---|---|---|
| Will NoPlug be successful in the marketplace? (NoPlug Success) | Yes | 1,500 (0) |
| Will people that already have televisions installed switch to NoPlug? (NoPlug Televisions) | No | 1,000 (0) |

Holdings: 2,500
Points: 12,201
Net Worth: 4,701

Net Worth Leaders

| | USERNAME | Net Worth |
|---|---|---|
| 1 | Winner | 56,672 points |
| 2 | Bwilson | 14,701 points |

ROI Leaders

| | USERNAME | ROI |
|---|---|---|
| 1 | Calliesheep | 3.44% |
| 2 | Garyebi | 2.48% |

TIPS AND TRICKS
A simple range is 500 to 1000 points for each question you wish to answer based on your level of confidence.

ANOTHER TIP

Figure 38

FUTURE TRENDS FORECASTING SYSTEM

CROSS REFERENCE TO RELATED APPLICATIONS

This application is a continuation of U.S. patent application Ser. No. 17/498,380, filed on Oct. 11, 2021, which is a continuation of U.S. patent application Ser. No. 16/562,923, filed on Sep. 6, 2019, which is a continuation-in-part of U.S. patent application Ser. No. 14/963,349, filed on Dec. 9, 2015, now U.S. Pat. No. 10,410,287, which is a continuation of U.S. patent application Ser. No. 14/066,344, filed on Oct. 29, 2013, which is a continuation of U.S. patent application Ser. No. 13/278,424, filed on Oct. 21, 2011, now U.S. Pat. No. 8,612,331, which claims the benefit of U.S. Provisional Application No. 61/405,352, filed on Oct. 21, 2010, each of which is hereby incorporated by reference in its entirety. U.S. patent application Ser. No. 14/963,349 is also a continuation-in-part of U.S. application Ser. No. 14/142,327, filed Dec. 27, 2013, which claims the benefit of U.S. Provisional Application No. 61/746,825, filed Dec. 28, 2012, each of which is hereby incorporated by reference in its entirety. U.S. patent application Ser. No. 16/562,923 is also a continuation-in-part of U.S. patent application Ser. No. 15/352,116, filed Nov. 15, 2016, which is a continuation of U.S. patent application Ser. No. 14/066,344, filed on Oct. 29, 2013, which is a continuation of U.S. patent application Ser. No. 13/278,424, filed on Oct. 21, 2011, now U.S. Pat. No. 8,612,331, which claims the benefit of U.S. Provisional Application No. 61/405,352, filed on Oct. 21, 2010, each of which is hereby incorporated by reference in its entirety. U.S. patent application Ser. No. 16/562,923 is also a continuation-in-part of U.S. patent application Ser. No. 15/218,718, filed Jul. 25, 2016, which is a continuation-in-part of U.S. application Ser. No. 14/142,327, filed Dec. 27, 2013, which claims the benefit of U.S. Provisional Application No. 61/746,825, filed Dec. 28, 2012, each of which is hereby incorporated by reference in its entirety.

1. FIELD OF THE INVENTION

The present invention relates to markets in general, and specifically to prediction markets and volumetric forecasting.

2. DESCRIPTION OF THE PRIOR ART

Prior art describes prediction markets that are used to determine the likelihood of success of employees' ideas or inventions, or steps in implementing such ideas or inventions, by allowing employees to bet on the success, buy and sell "shares" to indicate their belief in the likelihood of success, or otherwise assign relative weights to survey responses.

U.S. Pat. No. 7,299,204 for "System for winning investment selection using collective input and weighted trading and investing," filed on May 7, 2001 for inventors Peng et al., describes a system in which a group of investors (who may have a range of experience in managing investments) vote as to which stocks or other investments should be traded; a weight is assigned to each investor's vote based on his history of selecting "winning" stocks or other investments.

U.S. Pub. No. 2007/0250429 for "Prediction markets for assessing clinical probabilities of success," filed on Apr. 19, 2006 for inventors Walser et al., describes a prediction market for determining the success of an experimental candidate, such as a drug, in terms of meeting goals related to clinical trials and post-clinical trials, such as progressing through various regulatory steps of the trials.

U.S. Pub. No. 2009/0076939 for "Continuous betting interface to a prediction market," filed Sep. 13, 2007 for inventors Berg et al., describes a system and software in which the forecasting techniques of estimate contests and prediction markets are combined, in which an employee places a bet of a desired amount either in favor of or against an outcome.

U. S. Pub. No. 2009/0182624 for "Method and Apparatus for Generating and Evaluating Ideas in an Organization," filed Dec. 15, 2008 for inventors Koen et al., describes a prediction market for generating and evaluating employees' ideas in an idea market, specifically designed to predict the value of the idea. The idea market includes an automatic price-setting mechanism that modifies the share price as trades are made.

U.S. Pat. No. 7,356,498 for "Automated trading exchange system having integrated quote risk monitoring and integrated quote modification services," filed Dec. 30, 1999 for inventors Kaminsky et al., describes an automated trading system including integrated quote risk monitoring and quote modification, in which the quotes may have investor-defined trading parameters such as risk thresholds. An apparatus which carries out this system matches received quotes and orders to previously placed quotes and orders in order to make a trade, and also determines the risk level of such a trade.

U.S. Pat. No. 7,386,499 for "Stock trading limit order coupled link (Lock)," filed Jun. 6, 2001 for inventor Robert Kocher, describes a system that allows an investor to take advantage of stock price fluctuations without constant monitoring. Further describes that this system will accept a buy order from the investor, buy the stock at the specified price, and automatically submit a sell order at a higher price that is set by the user.

U.S. Pat. No. 7,337,135 for "Asset price forecasting," filed Oct. 19, 2000 for inventors Findlay et al., describes a method for predicting stock prices based on historical data and exogenous variables that are likely to influence the stock price, such as stock prices for companies in the same sector as well as macroeconomic variables.

U. S. Pub. No. 2003/0135445 for "Stock market prediction using natural language processing," filed Jan. 22, 2002 for inventors Eisner et al., describes a method of using natural language processing to extract information from online news sources and predict changes in stock price based on that information.

U. S. Pub. No. 2008/0319825 for "Virtual markets for selecting answers to open-ended questions," filed Jun. 19, 2007 for inventors Lacomb et al., describes a virtual market system used to rank-order answers to an open-ended question. A virtual market on which participants can trade securities representing answers to the open-ended question is used to gather information from the participants regarding each answer. Additional securities representing additional answers to the question may be added during the trading period, allowing for the answers to the question to evolve over the operation of the market.

U. S. Pub. No. 2009/0076974 for "Combined estimate contest and prediction market," filed Sep. 13, 2007 for inventors Berg et al., describes an estimate contest wherein users participate in a prediction market for forecasting the outcome of a future event. Users can express risk levels, which may be factored into virtual market trades.

U. S. Pub. No. 2009/0076939 for "Continuous betting interface to prediction market," filed Sep. 13, 2007 for inventors Berg et al., describes methods wherein a user participates in trading securities in a prediction market which represents different outcomes of an event, using an interface allowing the user to understand the trade in terms of a bet.

U.S. Pat. No. 7,451,213 for "Online forecasting system and method," filed Sep. 29, 2006 for inventor Craig A. Kaplan, describes systems and methods provide real-time online interactive forecasting of an element, wherein each element has a corresponding input and forecast information, which are submitted back to the user providing the input. A list of elements for forecasting may be provided wherein each element has a forecast that may be provided by a fixed or constant label, or default listing of elements.

U. S. Pub. No. 2007/0250429 for "Prediction markets for assessing clinical probabilities of success," filed Apr. 19, 2006 for inventors Walser et al., describes prediction markets used to determine the probability of an experimental therapeutic, diagnostic, or prophylactic candidate meeting clinical trial and post-trial goals, such as clinical trial endpoints and timelines. The prediction market processes buy and sell orders from market participants, while adjusting the prices of the securities according to the orders. The securities have specific meanings which correspond to goals in clinical trials or other outcomes in clinical candidate development. The price of a security determined by the market corresponds to the probability of the corresponding goal or outcome. The invention includes a liquidity management process configured to provide liquidity of the market and maintain sufficient price movement to maintain interest and trading levels while not distorting pricing signals. The liquidity management process can hold back a certain percentage of the security in the market.

Additionally, volumetric forecasting is well-known in the prior art.

U.S. Pat. No. 8,090,614 for "Generating a sales volume forecast," filed Oct. 23, 2007 for inventors Ford, et al., describes a method for generating a sales volume forecast includes receiving user input specifying a hypothetical asking price and a future date and accessing, for each of multiple past time periods, historical data reflecting a sales volume for an item over the past time period and a corresponding price difference between an asking price and a coinciding market price for the item, the price difference also being associated with the past time period. The method also includes determining a historical correlation for the item between sales volume and price difference between asking price and coinciding market price, accessing market data reflecting a future market price for the item associated with the specified future date, determining a price difference between the specified hypothetical asking price and the future market price for the item, applying the determined historical correlation to the determined price difference to generate a sales volume forecast, and providing the generated sales volume forecast for access by a user.

U. S. Pub. No. 2015/0317589 for "Forecasting system using machine learning and ensemble methods," filed May 8, 2015 for inventors Anderson, et al., describes techniques for determining forecast information for a resource using learning algorithms are disclosed. The techniques can include an ensemble of machine learning algorithms. The techniques can also use latent states to generate training data. The techniques can identify actions for managing the resource based on the forecast information. The resource can include energy usage in buildings, distribution facilities, and resources such as Electric Delivery Vehicles. The resource can also include forecasting package volume for businesses.

Additionally, volumetric forecasting is well-known in the prior art.

U.S. Pat. No. 8,090,614 for "Generating a sales volume forecast," filed Oct. 23, 2007 for inventors Ford, et al., describes a method for generating a sales volume forecast includes receiving user input specifying a hypothetical asking price and a future date and accessing, for each of multiple past time periods, historical data reflecting a sales volume for an item over the past time period and a corresponding price difference between an asking price and a coinciding market price for the item, the price difference also being associated with the past time period. The method also includes determining a historical correlation for the item between sales volume and price difference between asking price and coinciding market price, accessing market data reflecting a future market price for the item associated with the specified future date, determining a price difference between the specified hypothetical asking price and the future market price for the item, applying the determined historical correlation to the determined price difference to generate a sales volume forecast, and providing the generated sales volume forecast for access by a user.

U.S. Pub. No. 2015/0317589 for "Forecasting system using machine learning and ensemble methods," filed May 8, 2015 for inventors Anderson, et al., describes techniques for determining forecast information for a resource using learning algorithms are disclosed. The techniques can include an ensemble of machine learning algorithms. The techniques can also use latent states to generate training data. The techniques can identify actions for managing the resource based on the forecast information. The resource can include energy usage in buildings, distribution facilities, and resources such as Electric Delivery Vehicles. The resource can also include forecasting package volume for businesses.

SUMMARY OF THE INVENTION

The present invention relates to prediction markets.

It is an object of this invention to provide methods and systems for using prediction market probability estimates as input into volumetric forecasting models.

Accordingly, a broad embodiment of this invention is directed to systems and methods for volumetric forecasting based on prediction market probability estimates. Another embodiment of the present invention includes using alternative simulated starting values for prediction markets in order to determine the preferred starting values for prediction markets to use in volumetric forecasting. Yet another embodiment of this invention is directed toward a user interface that facilitates using prediction market probability estimates to determine volumetric forecasts.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 10 is an example of linking stocks according to the invention.

FIG. 17 is an example of the category addition interface of the invention.

FIG. 32 is another graphic user interface screen shot view according to an embodiment of the invention.

FIG. 33 is another graphic user interface screen shot view according to an embodiment of the invention.

FIG. 35 is another graphic user interface screen shot view according to an embodiment of the invention.

FIG. 36 is another graphic user interface screen shot view according to an embodiment of the invention.

FIG. 38 is another graphic user interface screen shot view according to an embodiment of the invention.

DETAILED DESCRIPTION

Figure 1:
FIG. 1 is a basic user interface of one embodiment of the invention.

The present invention is directed to systems and methods for volumetric forecasting based on prediction market probability estimates. Another embodiment of the present invention includes using alternative simulated starting values for prediction markets in order to determine the preferred starting values for prediction markets to use in volumetric forecasting. Yet another embodiment of this invention is directed toward a user interface that facilitates using prediction market probability estimates to determine volumetric forecasts.

In one embodiment, the present invention is directed to a system for future trends forecasting including a computer system comprising a server computer and at least one database in electronic, digital communication over a network, connectable or accessible remotely through the network by at least one device, the server computer running a software providing: an automated market maker; a liquidity management system (LMS) with administrative controls for the market maker that adjust a liquidity value; a transaction interface permitting an action involving a quantity of stock, currency, points, or tokens or a value of stock, currency, points, or tokens; and a future trends forecasting system; wherein the automated market maker automatically calculates and displays in the transaction interface the quantity of stock, currency, points, or tokens or the value of stock, currency, points, or tokens; wherein the future trends forecasting system is operable to determine a future trend forecast utilizing the action and the quantity of stock, currency, points, or tokens or the value of stock, currency, points, or tokens. The value of stock, currency, points, or tokens is determined based on a logarithmically spaced price ladder for the stock, currency, points, or tokens. The software is operable to automatically update the logarithmically spaced price ladder for the stocks, currency, points, or tokens based on the action involving the quantity of stock, currency, points, or tokens or the value of stock, currency, points, or tokens. The action is based on a prompt relating to a growth likelihood, a segment or a brand, a timing, or a rationale for a trend. The future trends forecasting system includes a machine learning algorithm operable to transform a set of actions including the action involving the quantity of stock, currency, points, or tokens or the value of stock, currency, points, or tokens into predictive data. The future trend forecast includes a growth likelihood, a segment or a brand, a timing, or a rationale for a trend, wherein the growth likelihood, the segment or the brand, the timing, or the rationale for the trend is calculated by the machine learning algorithm, and wherein the future trend forecast is updated based on a subsequent action received through the transaction interface. The action is associated with a rationale, wherein the transaction interface is further operable to receive a new rationale not currently listed in the transaction interface, and wherein the transaction interface is further operable to display the new rationale and receive a subsequent action for the new rationale.

In another embodiment, the present invention includes a system for future trends forecasting including a computer system comprising a server computer and at least one database in electronic, digital communication over a network, connectable or accessible remotely through the network by at least one device, the server computer running a software providing: a market maker; a transaction interface;

administrative controls operable to adjust a liquidity value; and a future trends forecasting system; wherein the market maker calculates and displays in the transaction interface a quantity of stock, currency, points, or tokens or the value of stock, currency, points, or tokens associated with an action; wherein the future trends forecasting system is operable to determine a future trend forecast based on the action and the quantity of stock, currency, points, or tokens or the value of stock, currency, points, or tokens. The value of stock, currency, points, or tokens is determined based on a logarithmically spaced price ladder for the stock, currency, points, or tokens, wherein the software is operable to automatically update the logarithmically spaced price ladder for the stocks, currency, points, or tokens based on the action involving the quantity of stock, currency, points, or tokens or the value of stock, currency, points, or tokens. The administrative controls provide for selective adjustment of sensitivity. Additionally or alternatively, the administrative controls provide for selective adjustment of fulcrum. Additionally or alternatively, the administrative controls provide for selective adjustment of window. Additionally or alternatively, the administrative controls provide for selective adjustment of quantity. A starting point for the quantity of stock, currency, points, or tokens or the value of stock, currency, points, or tokens associated with the action is pre-defined. The future trends forecasting system includes a machine learning algorithm operable to transform a set of actions including the action involving the quantity of stock, currency, points, or tokens or the value of stock, currency, points, or tokens into predictive data. The future trend forecast includes a rationale for a trend, wherein the rationale for the trend is determined utilizing the machine learning algorithm, and wherein the future trend forecast is updated based on a subsequent action received through the transaction interface.

In yet another embodiment, the present invention includes a system for future trends forecasting including a server computer and at least one database in electronic, digital communication over a network, connectable or accessible remotely through the network by at least one device, the server computer running a software providing: an automated market maker; controls for the automated market maker; and a transaction graphical user interface (GUI); wherein the automated market maker is operable to provide liquidity in the system by providing potential actions involving assets, wherein a value of the assets or a quantity of the assets associated with each potential action is determined based on a logarithmically spaced price ladder for the assets; and wherein the automated market maker calculates and displays in the transaction GUI the potential actions involving assets and the value of the assets or the quantity of the assets associated with each action. The system is operable to automatically update the logarithmically spaced price ladder for the assets based on an action involving the assets made through the transaction GUI. The potential action is based on a prompt relating to a growth likelihood, a segment or a brand, a timing, or a rationale for a trend. The administrative controls provide for selective adjustment of sensitivity. Additionally or alternatively, the administrative controls provide for selective adjustment of fulcrum. A starting point for the logarithmically spaced price ladder for the assets is pre-defined.

While the present invention is useful in all aspects of volumetric forecasting, it is particularly useful in early stage volumetric forecasting (volume potential) and late stage (year 1 and year 2 volumetric forecasts). The present invention can be utilized in modeling advertising effectiveness and market mix modeling as well as volumetric forecasting.

Consensus in a hierarchy is frequently biased and thus conceals truthful answers. The purpose of the present prediction market system is to uncover truthful answers to relevant questions by searching for informed disagreement with the consensus answer to a question. The present invention retrieves disagreement by having disagreeing investors make money if they are correct in their disagreement. The reward of disagreement increases the stronger the disagreement with the current consensus. This motivates investors to invest against a stock as soon as they learn new information about the stock. This promotes the timely delivery of disagreement information.

The present invention uncovers disagreement information through the investor review of questions. Investors do not generally invest in questions where they agree with or have no opinion on the current consensus. This has a side effect of identifying bad questions that are unclear, ambiguous, not on target, and the like. Also, investors will comment on bad questions. Thus, the system according to the present invention will help determine which questions are bad and what is the right question.

Additionally, because investors submit questions, the generation of questions by investors helps the administrator identify uncertainty in the business or operation.

The system has several interactive functions that together form a working system that is readily usable by the investors and administrators. These functions are offered to the users on various interfaces.

Thus, the present invention provides for a prediction market system, including a computer system including a server computer and at least one database in electronic, digital communication over a network, connectable or accessible remotely through the network by at least one other remote computing device, the server running a software providing an automated market maker; a liquidity management system (LMS) with administrative controls for the market maker for sensitivity, quantity, fulcrum and window in order to provide enough liquidity so that about all answers receive investment by investors who are potentially informed enough to make an investment, but not so much that investors can invest beyond their informed ability; an investment transaction interface, wherein the investment transaction interface includes an interactive slider interface with a slider control that allows one-step user selection to choose the amount of money to manage and wherein the automated market maker automatically calculates and displays in the investment transaction interface the amount of stock the user is to receive or sell; thereby providing a prediction market system that is intuitive and gives good predictions.

The automated market maker creates liquidity in the system by providing ongoing buy and sell orders that are logarithmically spaced in a price ladder. The automated market maker also provides for double auction by incorporating limit orders. The administrative control for are preferably set as follows: The sensitivity is about 20; the quantity is about 100; the fulcrum is about 50.00 and the window is about 30.

The investment transaction interface permits buying and selling shares with the same slider in a single action. The payout is binary or variable. The stocks are grouped and/or linked.

The system provides for a computer-readable code stored in a storage medium and executable by one or more processors, which when executed provides a prediction market system that includes: an automated market maker; a liquidity management system with administrative controls for the market maker for sensitivity, quantity, fulcrum and window, in order to provide enough liquidity so that so that about all answers receive investment by investors who are potentially informed enough to make an investment, but not so much that investors can invest beyond their informed ability; and an investment transaction interface, wherein the investment transaction interface is a slider interface with a slider that allows the user to move the slider to choose the amount of money to manage and the system automatically calculates and displays in the investment transaction interface the amount of stock the user is to receive or sell; thereby providing a prediction market system that is intuitive and gives good predictions.

The present invention further provides for a computer-readable code stored in a storage medium and executable by one or more processors, which when executed provides an electronic stock and commodities exchange system, the exchange system including an interactive user investment transaction interface; the interface including a slider for choosing the amount of money to manage and wherein the interface calculates the amount of stock and/or commodities the user is to receive or sell. The exchange system and investment transaction interface permit the buying and selling shares, options and combinations therefore with the same slider in a single action.

Questions/Stock Interface

The Questions/Stock interface lists the active questions/stocks in which an investor can invest. The investor may also suggest questions on this interface. Investors preferably also receive an incentive for suggesting questions. For example, an investor may receive 10,000 points for a question that is accepted and used.

Once a question is submitted, the administrator reviews and then either approves or rejects the questions. If a question is approved, the administrator categorizes and tags it and submits it to the market. Questions can then be sorted by categories and/or tags, which facilitate the investors finding questions of interest. Other filters, such as comments or starring questions, can also be used to sort the questions.

Investment transaction interface.

Once an investor has chosen a question to invest in, they go to the investment transaction interface for that question/stock. This interface gives details about the question/stock.

The system uses different graphical user interfaces to assist the investors in their investments. The interfaces include a basic interface, a slider interface, and an advanced interface. In one embodiment, the interface provides for a single action of placing a bet on Yes/No options while at the same time choosing a value from a slider or a drop down menu. In one embodiment, a second step is an open end response question.

Basic Interface

A basic transaction interface, generally described as 100 in FIG. 1, allows a trader to directly enter, either in cash or shares, the amount of investment. Alternatively, investment is made using tokens, points, cryptocurrencies, or any other method of value or assets. The transaction may either be a buy or sell transaction to move the current consensus up or down, respectively. There is no restriction on selling that requires prior ownership of shares prior to selling (also known as short selling). A buy or sell transaction has an immediate cost to the trader that is dependent on the current consensus and their investment decision. For example, it costs $10 to buy a share when the current probability (price) is 10% ($10). Shorting the same share would cost $90 (i.e., $100−$10=$90).

If the trader has previously answered the question and has current shares (long or short) in the question, then those are automatically taken into consideration in the transaction.

Confirmation is provided to the trader that their order has been executed in the system.

Display Value

As with most markets, the current price reflects the aggregation of beliefs and opinions that the participants have about the underlying asset. With a traditional prediction market, the stock price is actually the probability from 0% to 100%, but displayed as $0-$100. Thus, a stock price of $89.20 equates to a probability of 89.20%. However, not all stocks within a prediction market are intended to yield a probabilistic estimate. There are times when a different measurement is more useful, such as a specific date at which a project will be completed. In these cases, the stock price doesn't represent a probability, but the actual value of the forecast. As opinions about the forecast change amongst the participants, the forecasted value will update accordingly.

In the present invention, a number of ways have been developed to represent the price into a form that is more intuitive to the user. These include probabilities, dollar amounts, calendar dates, numbers of items, and a user-defined field to create a custom label. When this feature is utilized, the price is automatically converted from the standard display configuration to one that is contextualized to the particular forecast.

Figure 2:
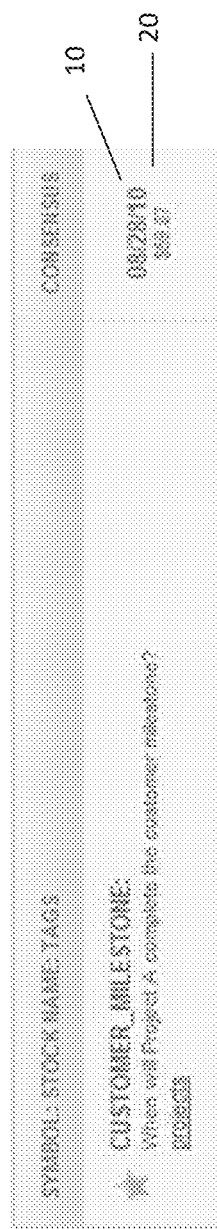
FIG. 2 is another user interface of one embodiment of the invention showing a project completion data.
Figure 3:
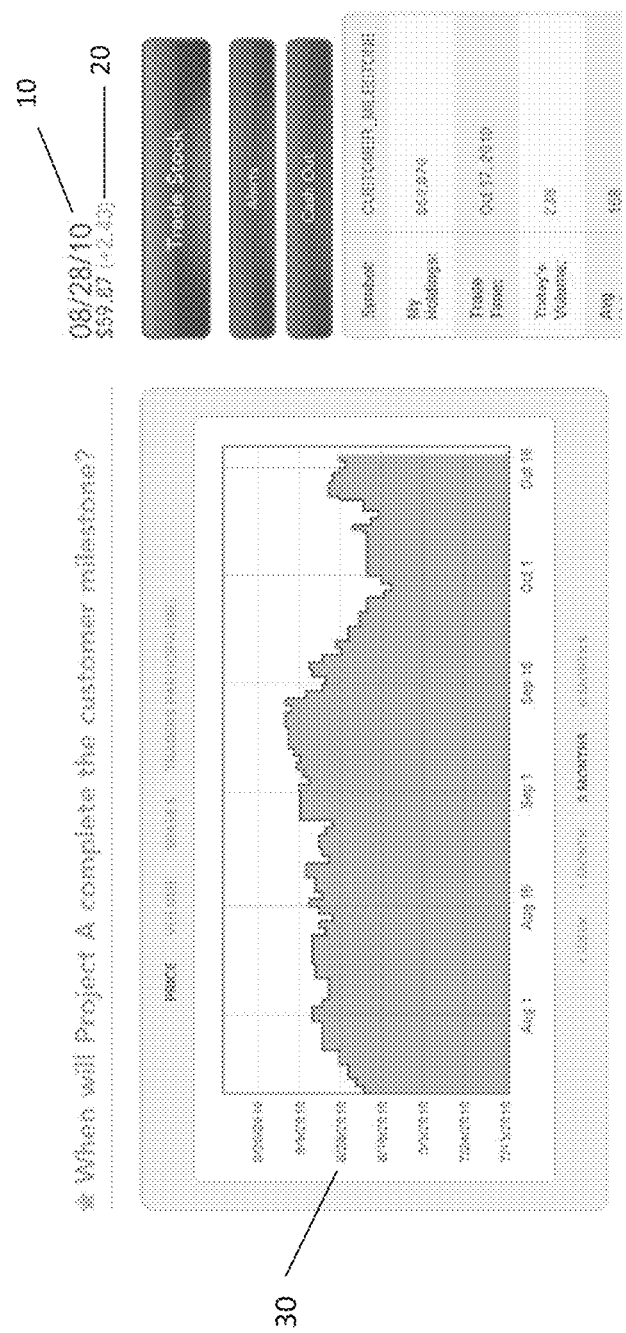
FIG. 3 is another user interface of one embodiment of the invention showing a project completion data.

An example, shown in FIGS. 2 and 3, describe a project completion date. The consensus project completion date 10 and price 20 are shown in FIG. 2. The other possible dates 30 are also shown if FIG. 3. When a user selects an answer date, the interface provides the price.

As stated previously, the benefit of this capability is that it is more intuitive to the user. By representing the stock price as the actual value of the forecast, the participant immediately knows what the current consensus is and they don't need to do any calculations in order to understand what they need to know.

Slider Interface

The system advantageously helps investors to make bets by providing a more interactive interface that provides immediate information regarding investing in an answer or stock.

Figure 4:
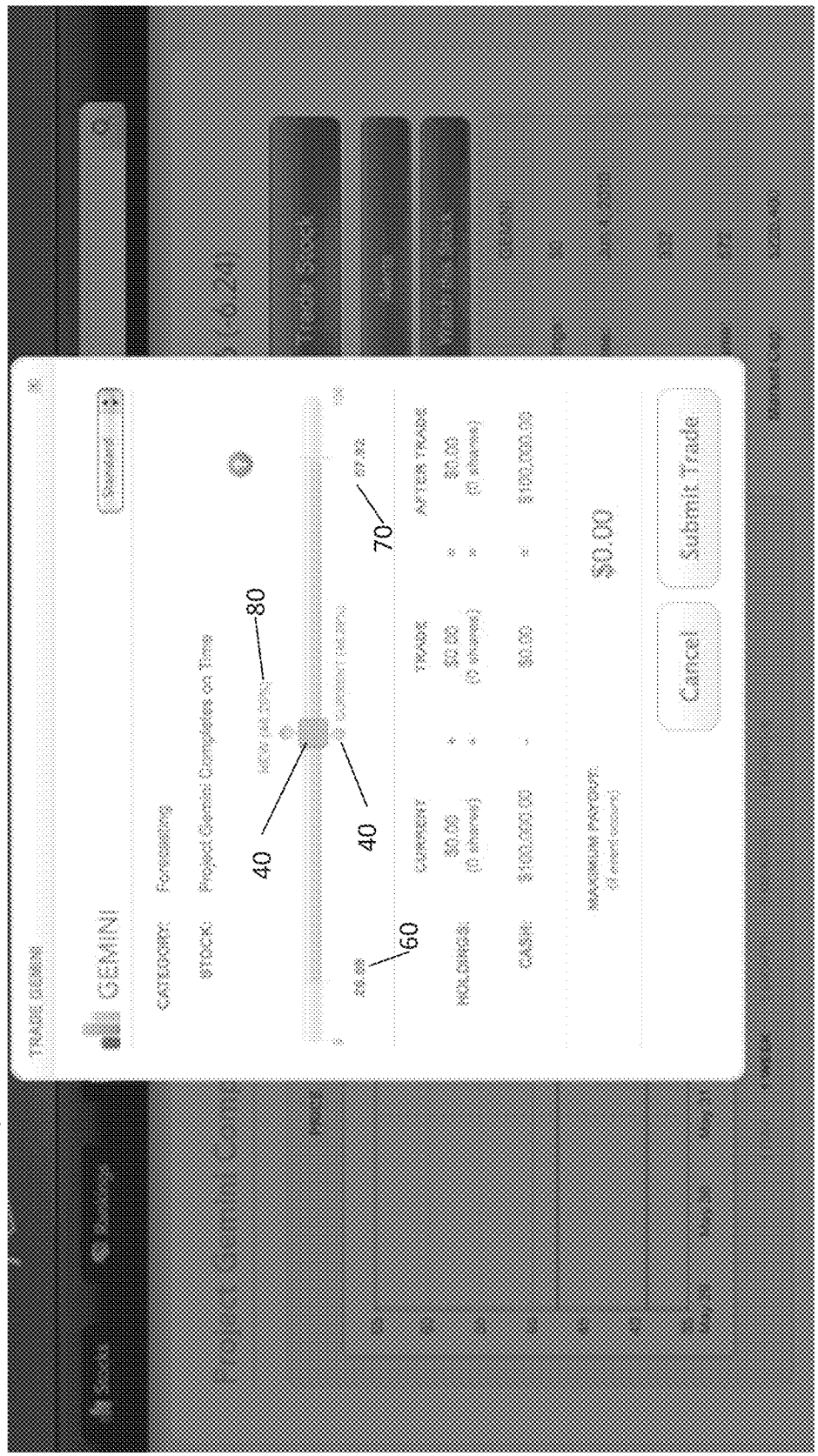
FIG. 4 is another embodiment of the invention showing a slider interface.

The present invention does this by providing a slider interface that helps users understand the complex interactions of making investment in this market. An example of the slider interface, generally described as 200, is shown in FIG. 4.

In many traditional prediction market applications, when a user wants to make a trade, they are presented with an interface that requires them to enter a specific number of shares they want to buy or sell in that transaction. The system then determines how much that trade will cost, and supplies this information to the participant. Unfortunately, this process can be somewhat cumbersome and even confusing to users, especially novices.

As an alternative, the Present invention platform presents an intuitive slider interface that allows the user to vary the amount of money that will be transacted. When a decision to trade has been made and the 'Trade' button is selected, the trading interface automatically overlays the screen, rather than redirecting to a different web page. By default, the slider bar 40 is positioned at the market consensus 50 when it loads. To input a trade, the user simply grabs the slider bar and moves it across the spectrum to the desired position. Additionally, each end of the spectrum 60, 70 is dynamically determined by the amount of money that that particular user is able to use in the transaction. Once the slider bar begins to move, the software platform automatically informs the user the cost of the trade 80.

As individuals tend to think in terms of how much money they want to use, rather than a specific number of shares they want, this unique interface ends up being much more intuitive and informative to those participants. Because trades can be made more quickly and efficiently, users don't have to contend with unnecessary complexity.

During initial investment, as the slider is moved away from consensus, it costs more to invest.

On subsequent investments/divestments, he can get back money or it may cost him money (loss/profit). If the price has changed, he may make more or less money. The profit/loss is determined by these factors:

Average Initial Investment Price (Cost Basis)
Consensus Price (Current Price)
Direction of consensus movement (investment direction).
Consider the following examples.

Figure 5:
FIG. 5 is an example use of the slider interface.

Example #1, shown in FIG. 5: New investment; increase consensus from current 24.97 to 27.89. In this example, moving the consensus from 24.97 to 27.89 costs the trader $2702 and provides 100 shares in return.

Figure 6:
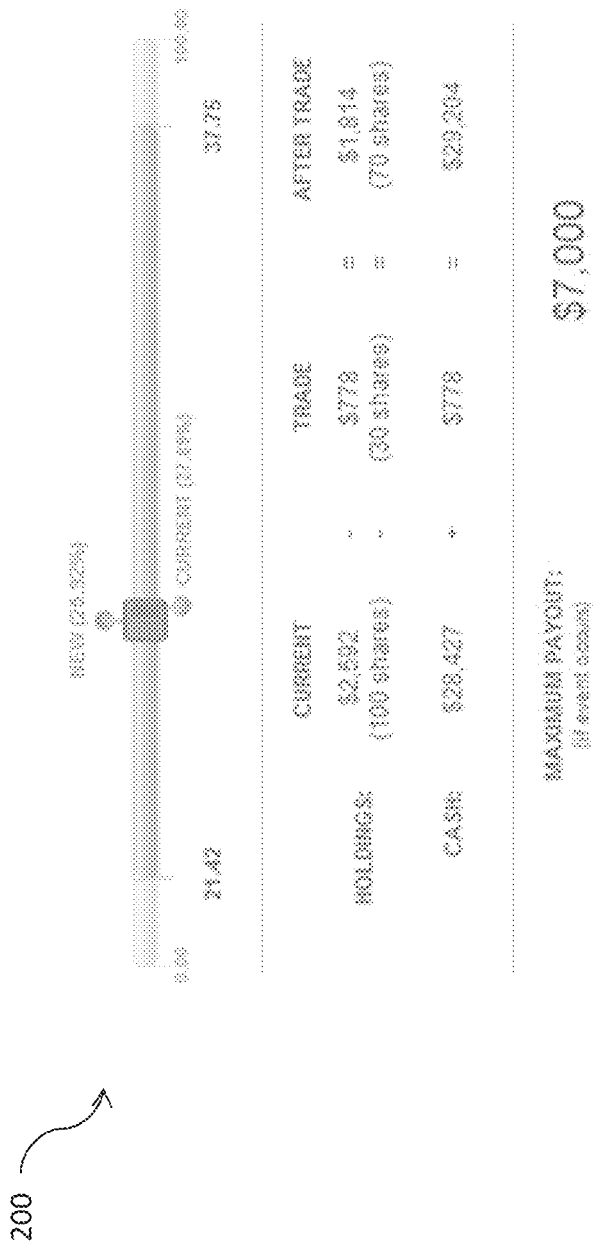
FIG. 6 is another example use of the slider interface.

Example #2, shown in FIG. 6: Second investment; reduce consensus from 27.89 to 25.92. In this example, reducing the consensus effectively reduces the trader's position from 100 to 70 shares (selling 30 shares). The transaction nets a positive cash gain of $778.

Figure 7:
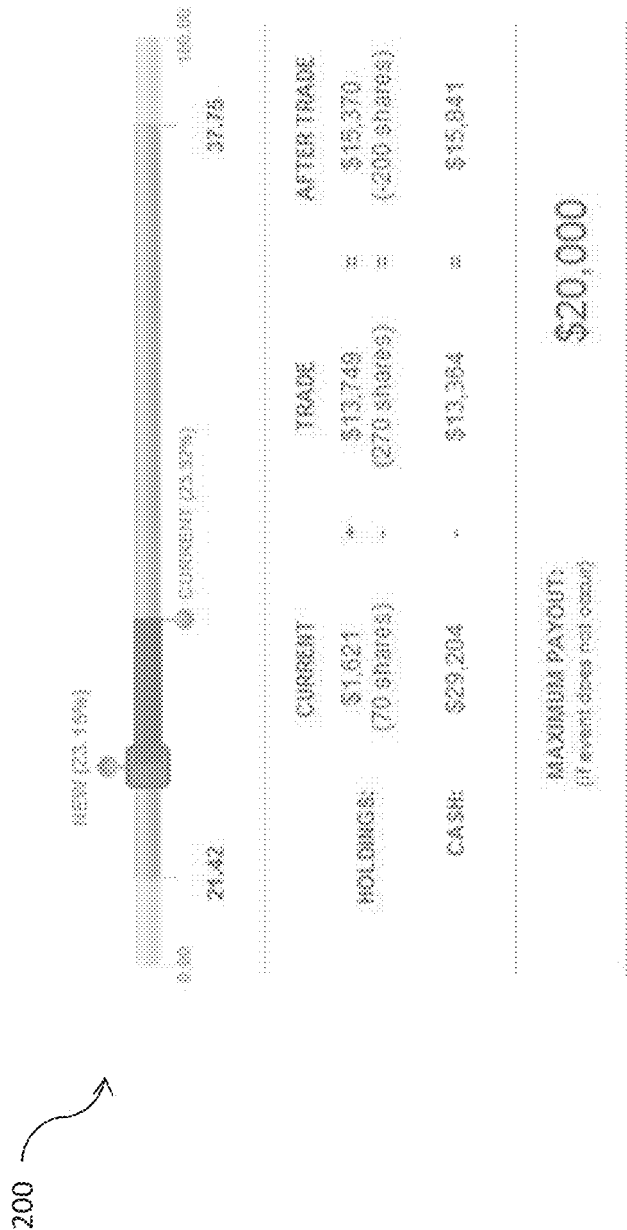
FIG. 7 is another example use of the slider interface.

Example #3, shown in FIG. 7: Third investment; reduce consensus from 25.92 to 23.15. In this example, reducing the consensus effectively reduces the trader's position from 70 to −200 shares (selling 270 shares). The transaction nets a positive cash gain for the first 70 shares sold, but then costs the trader for the remaining 200 shares. The total net cost of the transaction is $13,364.

Figure 8:
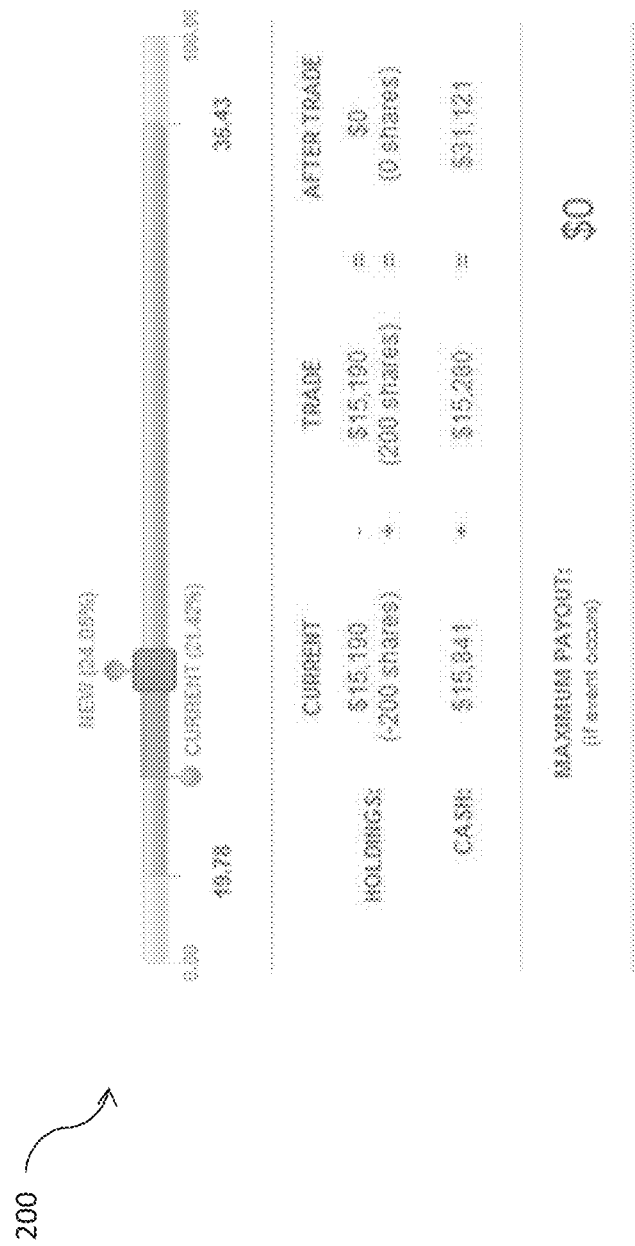
FIG. 8 is another example use of the slider interface.

Example #4, shown in FIG. 8: After the trader's third transaction, another trader moves the consensus from 23.15 to 21.42. This is further in the direction that the first trader moved the consensus, thus they could potentially profit from being ahead of the consensus. If the trader eliminates their full position at this point, they will buy (cover) the 200 shorted shares, thus moving the consensus back up to $24.05. The transaction would net a gain of $15,280 in cash from the transaction.

The present system differs from a real market, in that orders are not being matched in real market. The system is filling orders, not the other investors. The present system behaves more like a futures market selling naked options, in that futures options are always available even though the seller may not possess the asset. Thus, the system provides an automated market maker (AMM). The automated market maker also allows for double auction by incorporating limit orders.

An investor can only move an answer (buy stock) between two limits shown on the slider bar. These limits are calculated by the system and represent the investor investing all his available points in either a short or long position. These are the lower and upper boundaries of personal investment. This feature facilitates an investor understanding how much he can invest and thus saves the investor time.

Figure 9:
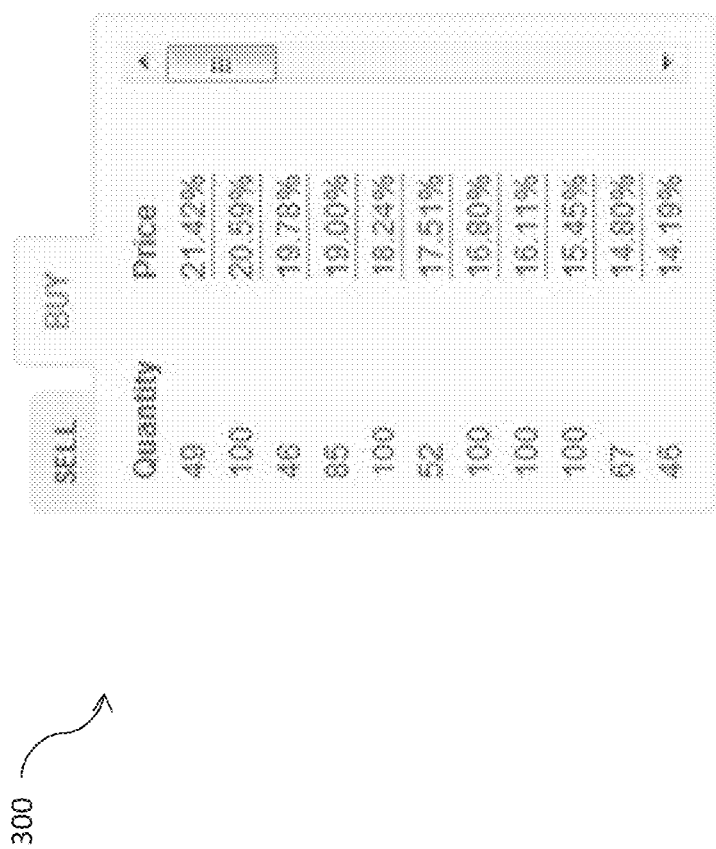
FIG. 9 is an example of an order book embodiment of the invention.

Prices are distributed in a ladder, or order book. A visualization, generally described as 300, is shown in FIG. 9. The order book steps are spaced apart logarithmically. That is, where each step represents the same number of points, the steps are wider in the middle and closer on the ends, away from the median. Therefore, more points are required to move the slider a step as the slider moves away from the median. The spacing of the steps and number of shares initially offered at each step is determined for each question via AMM configuration parameters. Thus, the automated market maker creates liquidity in the system by providing ongoing buy and sell orders that are logarithmically spaced in a price ladder.

The slider interface can also be used in actual market transactions. An investment transaction interface for trading actual shares in a stock and commodities exchange includes a slider for choosing the amount of money to invest or divest. The interface calculates the amount of stock the user is to receive or sell. This interface permits buying and selling shares with the same slider in a single action. Furthermore, the interface permits the buying and selling of shares and/or options with the same slider in a single action. In these embodiments, the limits are the available money in the user's account and/or the stock or options the user has available to sell. The prices are the actual prices that other buyers and sellers of the stock have chosen.

Payout

Investors holding a stock receive a payout once the correct answer to a question has been determined. There are two types of payout schemes—binary and variable.

A binary payout scheme is used when there are only two answers to a question, such as "yes or no". If the investor chooses the correct answer, he receives $100. If he chooses the incorrect answer, he gets nothing ($0). Whether an investor chooses a correct or incorrect answer depends on his direction of movement of the consensus. If he moves the consensus towards the correct answer, then he wins. If he moves the consensus towards the incorrect answer, he loses. The net profit/loss for answering the question depends on the price paid for the shares to answer the question.

A variable payout scheme is used when the answer to the question is not binary. For example, when determining an event date, a range of dates can be offered as answers. How close an answer is to the actual event date determines the amount of payout. The variable payout range is between $0 and $100. The payout is simply given to the trader for each share held. For example, a trader holding 10 shares that are paid out at $70 is given $700 cash for their shares. The net profit/loss to the trader is determined by the average cost basis of their shares held at time of redemption. For example, if the trader holds 10 shares with an average cost basis of $60 and the redemption price is $70, then the trader will net a profit of 10 shares×$10 profit/share=$100.

Grouping Stocks

Stocks that are related can be grouped together such that an investor can view them as a group. Stocks can be grouped in two configurations: independent or linked.

Figure 11:
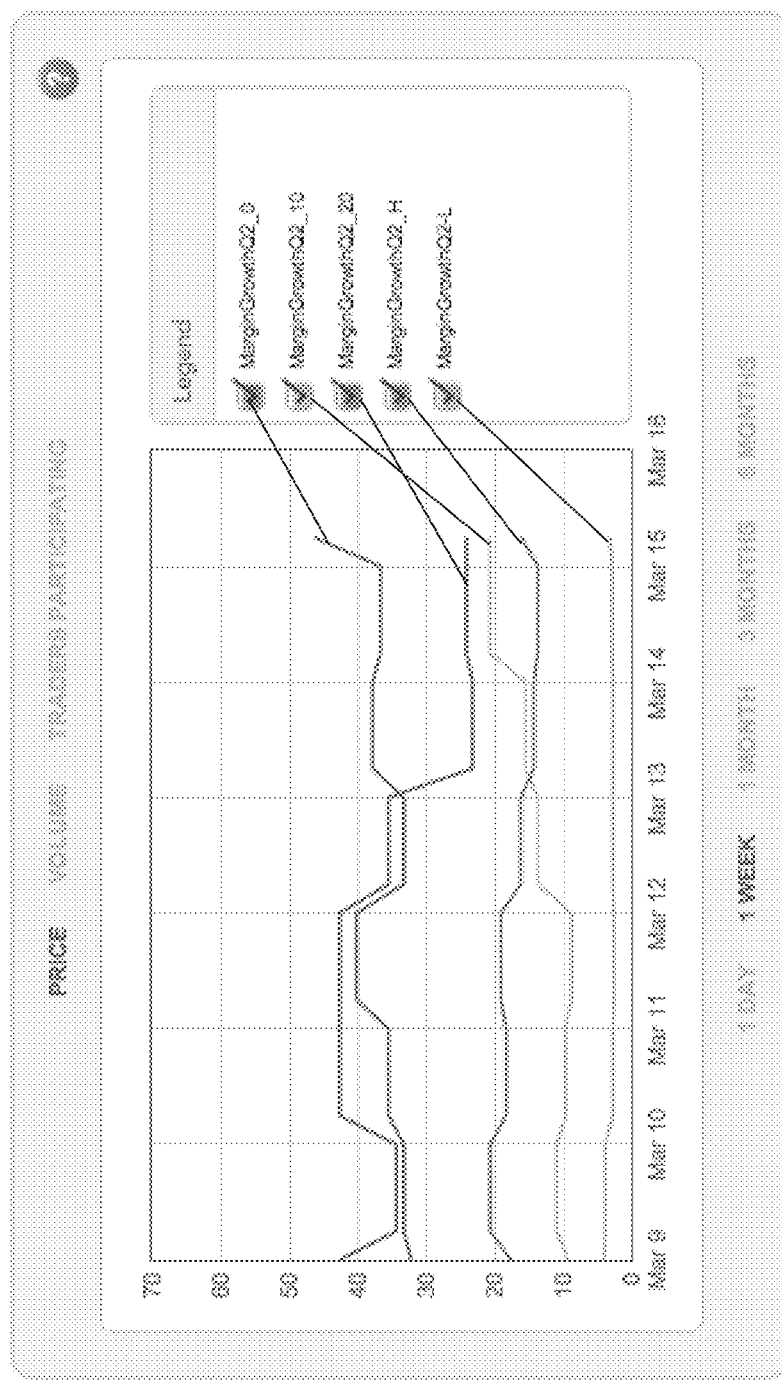
FIG. 11 is an example of graphing stock trends according to the invention.

For example, as shown in FIG. 10, there are 5 predictions for margin growth in the second quarter—less than 0%, 0-10%, 10-20%, 20-30%, greater than 30%. The stocks are linked together such that the sum of the probabilities is 100. FIG. 11 shows the trends for these stocks.

Figure 12:
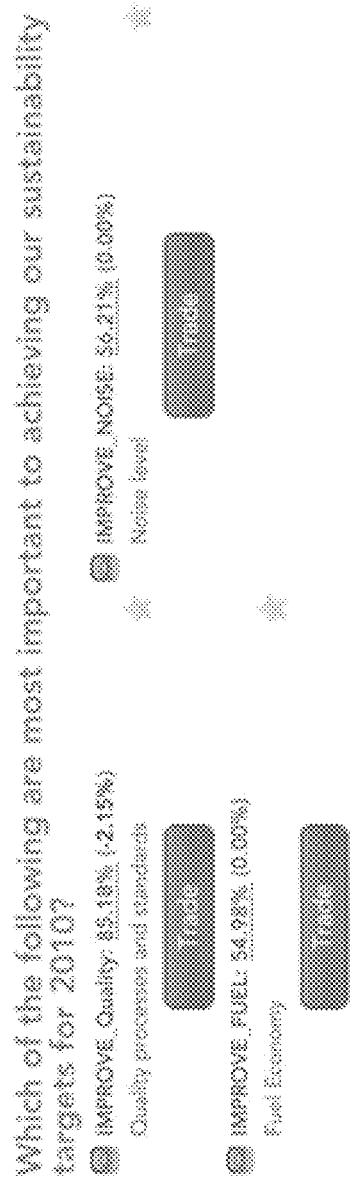
FIG. 12 is an example of grouping stocks according to the invention.

Additionally, related stocks can be grouped together but not linked, thereby maintaining independent consensuses. FIG. 12 shows the probabilities for each of the stocks in a grouped, unlinked set of stocks.

In certain scenarios, using stocks in linked sets provide some very important benefits when compared with simple binary prediction markets. The example shown in FIG. 10 could be created using five discrete stocks, but the informational value that a decision maker hopes to receive from the market would be reduced due to this fundamental inefficiency. By using an algorithm to automatically adjust these prices, it provides a greater level of clarity that enables a decision to be made with more certainty about the future outcome. This clarity comes from the fact that the linked prices represent a distribution curve across all the possible outcomes.

An added benefit of this approach is that it's more intuitive to the user. This allows people to take advantage of the knowledge they might have about a portion of the distribution, instead of requiring them to know about the entire range of possibilities. Said another way in the context of the example shown in FIG. 10, I might not know specifically how much sales we're going to have in April, but I know that it's going to be less than 10 million, so I'm going to push the probability of that event upward. As a result of doing this, my actions influenced the prices of the other two stocks and thus make the market more efficient, or, in other words, make the market more accurate.

Liquidity Management Process

For the proper functioning of the system, a sufficient, but not excessive, amount of liquidity should be available to investors. Investors' liquidity is managed to prevent the following: uninformed gambling; manipulating the market; and introducing excessive market volatility; thereby investors will tend to only invest in what they know if they can't invest in everything. These investing behaviors result in incorrect disagreement information being received from the investors and are therefore undesirable and make the prediction system inaccurate. However, sometimes active traders are given more points because they could provide more information if allowed more liquidity. For example, over a time period, a trader may have made poor choices, lost points and thereby reduced their influence in the market. Since new questions are introduced regularly into a market, it would be advantageous to have this trader still be capable of participation since they may have information about the new questions. A suitable default amount for new traders has been determined to be 100,000 points, which works well when other constraints of the system are set to the default settings, as describe elsewhere in this document.

As an example of too much liquidity in a case study, an administrator gave 900,000 points to each investor. With so much money, the investors introduced significant volatility into the market and made it difficult for the system to produce good predictions. Thus, importantly in the present invention, three values an administrator needs to evaluate to ensure proper functioning of the system include: How much money to give each investor; how many questions to allow into the marketplace; how many participants will be in the marketplace.

Currently, there is no way to distinguish between agreement with consensus and lack of funds to invest. Therefore, the administrator needs to manage liquidity settings in order to provide enough liquidity so that all answers receive investment by investors who are potentially informed enough to make an investment, but not so much that investors can invest beyond their informed ability. Thus, each investor should not receive enough money to invest heavily in all questions because an investor probably does not have sufficient information to answer all questions truthfully.

The prediction markets and algorithms of the present invention provide administrative control on where to start, sensitivity, how much leeway to provide the fulcrum at the middle, for example, whether to make the settings more like a normal (Gaussian) distribution curve, such that it is harder to get to extremes on the bell curve, because it is desirable to not give any user too much liquidity. Also, the present invention facilitates the administrator controls questions like: How hard or easy to move the probability at the midsection versus the endpoints of the curve, the type and numbers of questions, and the like.

In addition to the previous considerations, the system provides for control of the following parameters in order to manage liquidity:

Sensitivity: The sensitivity is a number from 1 to 100 that determines how closely-spaced the market maker's buy and sell orders are placed. Low values mean that there are larger gaps between orders, so the stock's price will move quickly. High values mean there are smaller gaps between orders, so the stock's price will be harder to move.

Quantity: The number of shares the market maker offers for each of its orders.

Fulcrum: The starting price around which the market maker places its orders. Sell orders are placed above this price, buy orders are placed below it.

Window: How many orders the market maker maintains at a time. A window of 10 means the market maker will maintain 10 buy and 10 sell orders at a time, replenishing them when a human trader matches them.

Advantageously, the systems and method of the present invention use known complicated algorithm for prediction markets, but the slider user interface greatly simplifies the user interface, namely by providing mechanisms for doing everything with one single movement of the slider.

The present invention has default settings, arrived at through experimentation, which achieve this balance. These default settings are as follows: Sensitivity –20; Quantity –100; Fulcrum –50.00; Window –30.

There are a number of benefits to having this much configurability over the liquidity settings. First of all, a market administrator can adjust the market's liquidity settings very precisely when adding or managing stocks in the market. If the market has a large volume of people, they may decide to set the liquidity very low since there are so many traders participating and the market already has a sufficient amount of liquidity. Alternatively, in times when the market has a low amount of liquidity, like when there are low numbers of traders, the administrator has the ability to boost the amount of liquidity by adjusting these variables.

In general, the volume traded is not an indication of success in prediction markets. This is because the quality of answers is more important than the quantity of investment. Remember, the purpose of the system is to uncover truthful answers; therefore, if these answers are obfuscated by an excess of liquidity, then the informed answers risk being lost.

The adjustment of the liquidity settings must also consider the number of participants. Assuming each stock, on average, costs $50/share, a participant with an initial funding of $100,000 would be able to invest in 2000 shares. Further assuming the default of 100 shares per price unit, this indicates a participant could move 20 different stocks 10 price steps each. Given they would not have knowledge of all stocks in market, a market with 50 concurrently active stocks would present the participant with 20 stocks they would be interested in investing.

Administrator Interface

Figure 13:
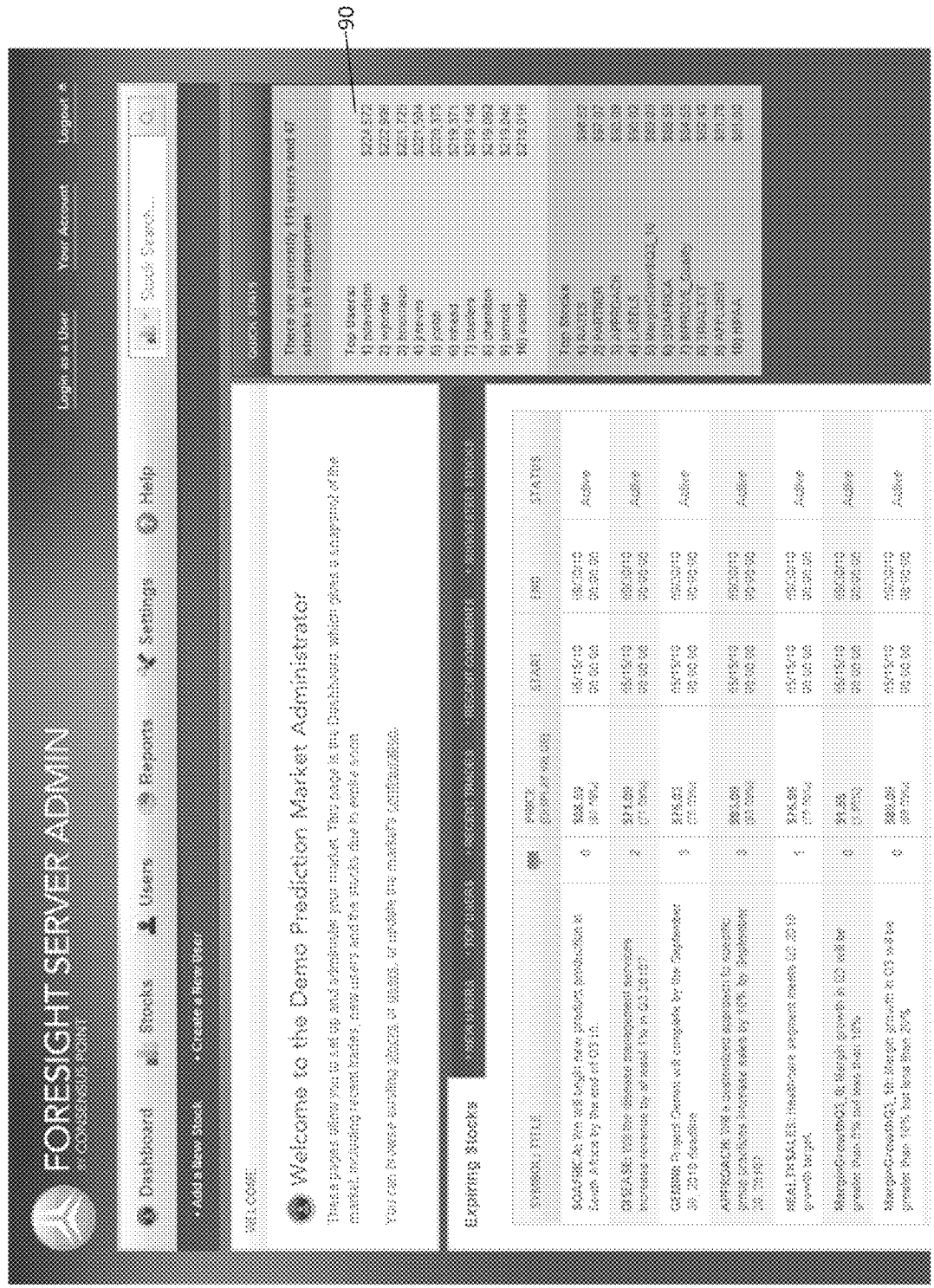
FIG. 13 is an example of the administrator interface of the invention.

The administrative interface includes pages for administering stocks, users, markets and the like and for generating reports. A dashboard page, generally described as 400 in FIG. 13, is preferably available. It preferably gives data for the market, including recent trades, new and top users, stocks due to expire, and the like. An optional sidebar 90 shows other relevant information, in this example the top users and the top stocks.

Figure 14:
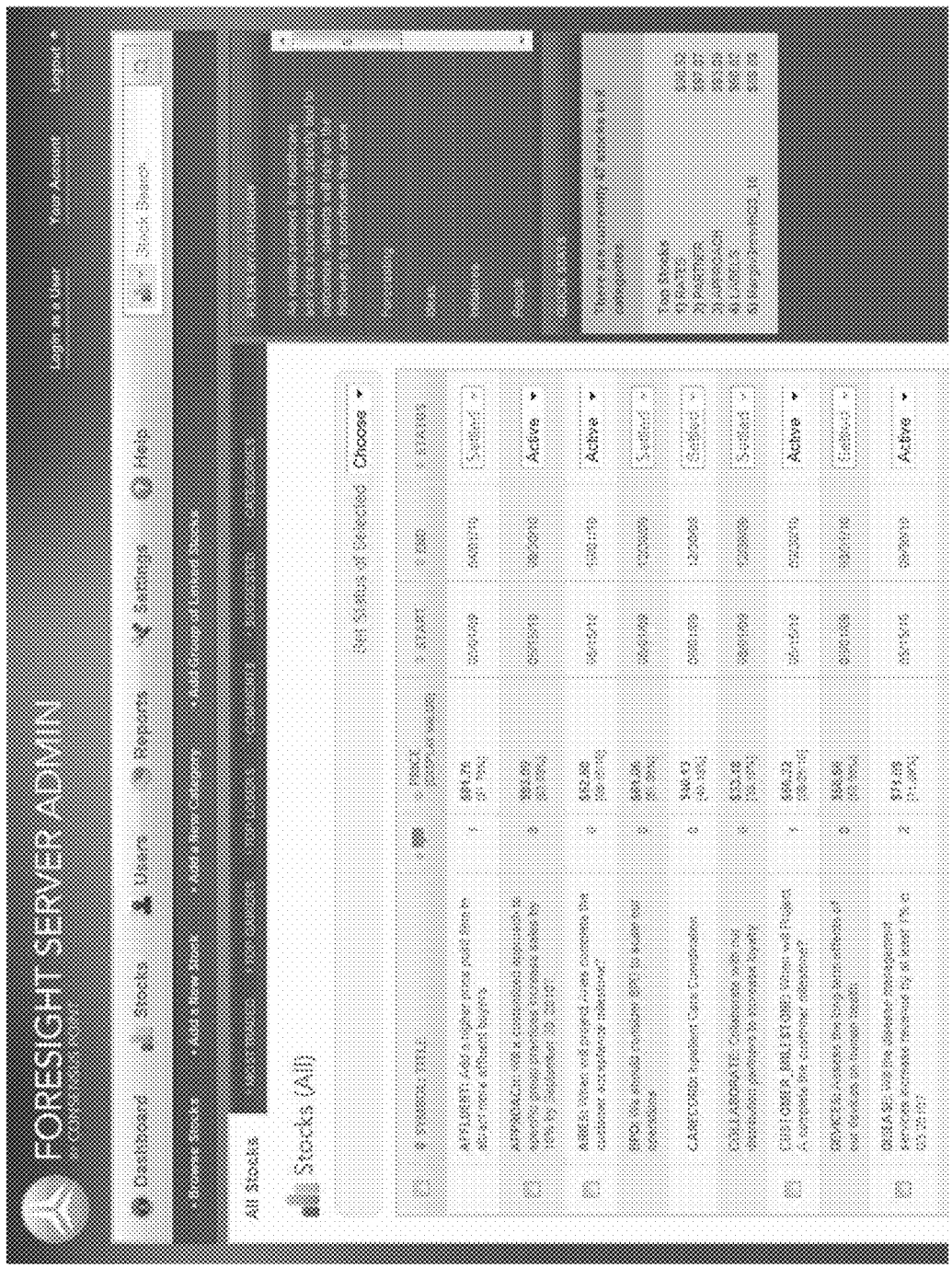
FIG. 14 is an example of the stock page interface of the invention.

The stock pages (FIG. 14) include pages for showing the stocks in various reports and categories and relevant stock information, including all stocks, most traded, top gainers and losers, comments, suggested stocks, categories, and the like. The status of each stock can be set through this interface.

Figure 15:
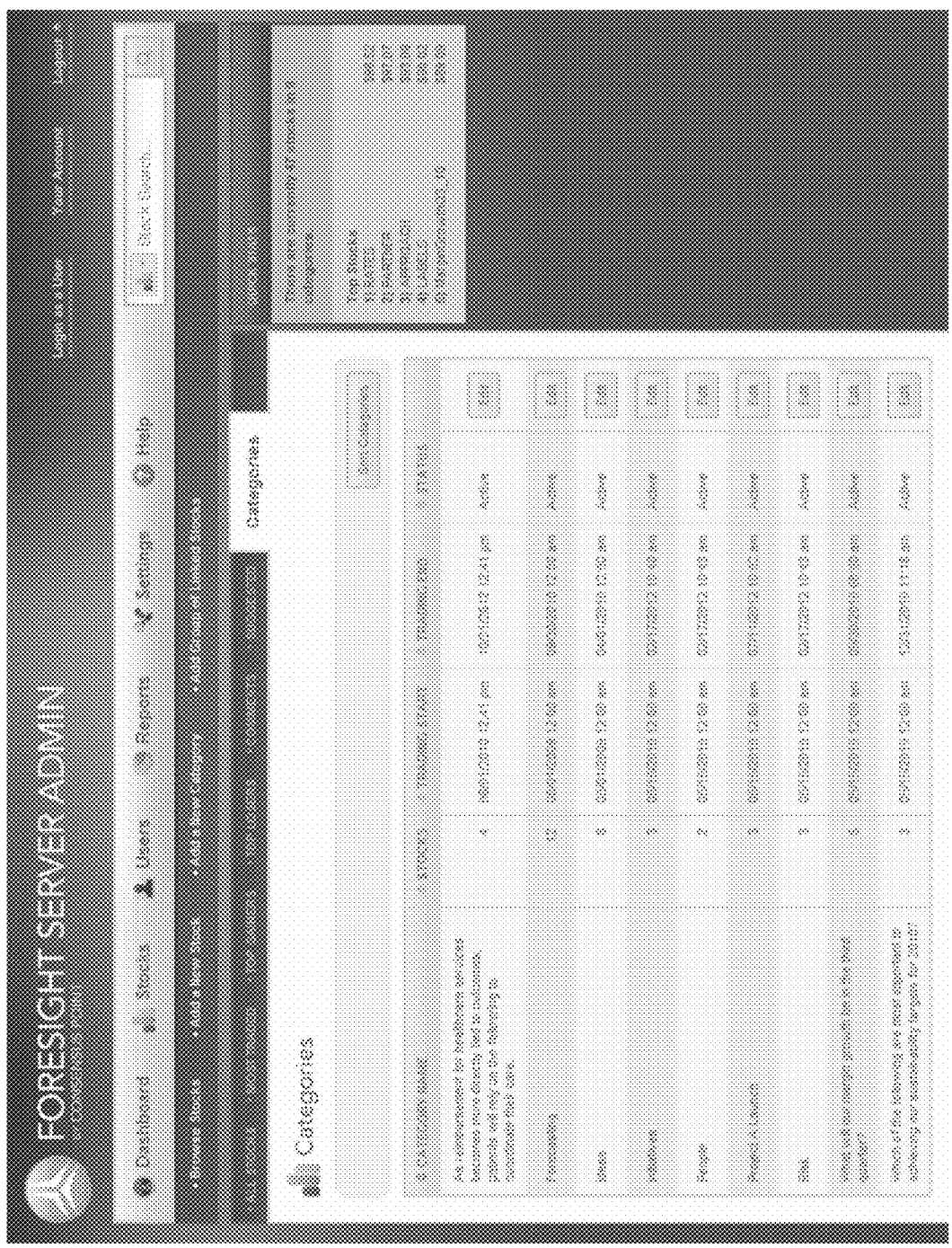
FIG. 15 is an example of the stock categories interface of the invention.

The Dashboard Stock Categories pages (FIG. 15) shows the categories used and relevant information for each category, such as name, number of stocks, starting and ending date/time of trading, and the status.

Figure 16:
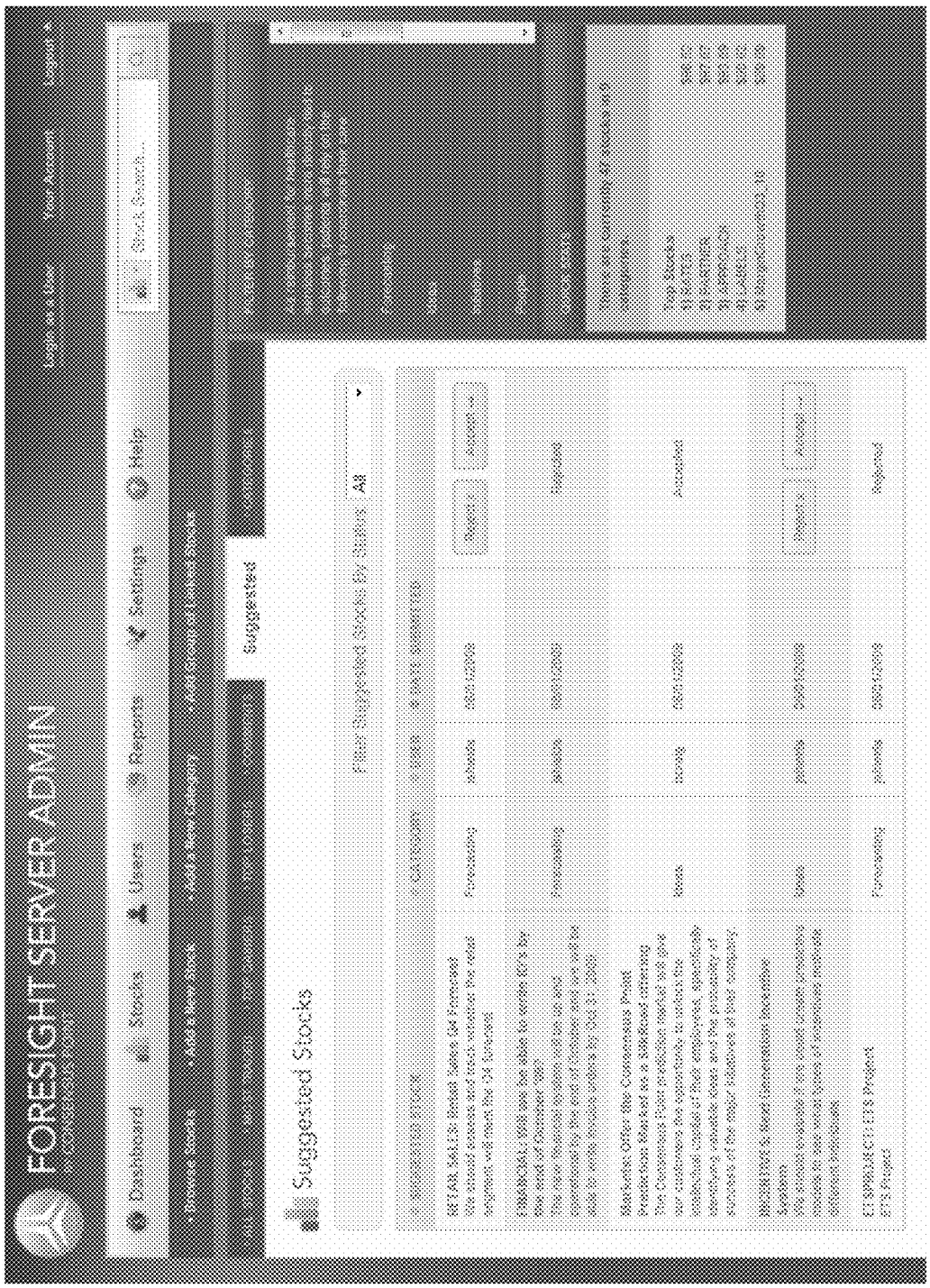
FIG. 16 is an example of the suggested stocks interface of the invention.

The Dashboard Suggested Stocks pages (FIG. 16) shows the suggested stocks, including a name and brief description, category, suggesting user, submission date, and status (accepted/rejected). Stocks can be accepted or rejected through this page.

Figure 17:
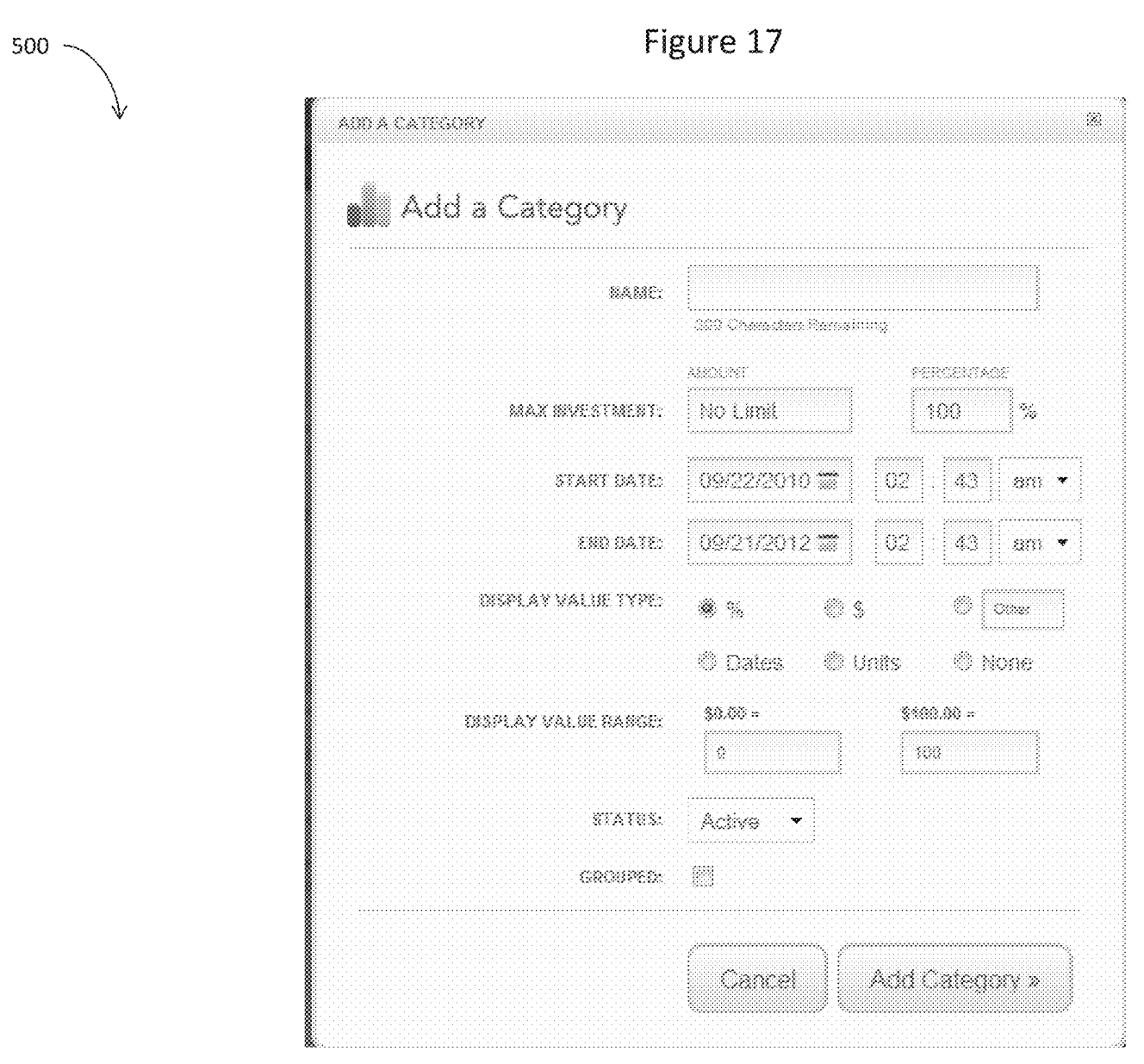

Categorizing stocks is useful and permits the administrator and users to quickly look at a related group of questions/ stocks. To add a category, the administrator opens the appropriate form (generally described as 500 in FIG. 17) and generally needs to provide the following: a name; determine if there is an investment limit; provide a start and end date; select a display value type and, if appropriate, a display value range; chose the status (active/inactive) and indicate if the category is grouped.

Figure 18:
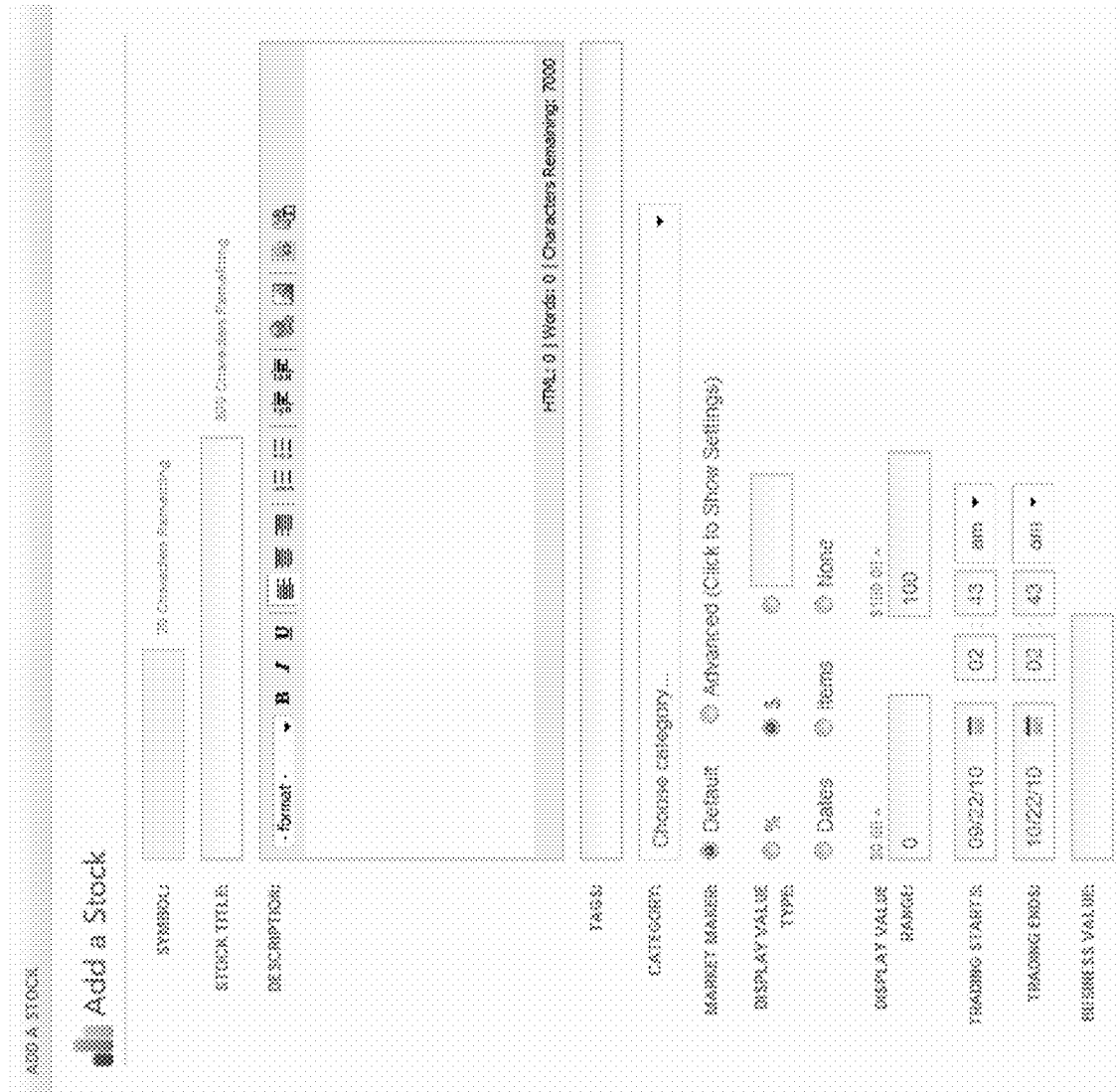
FIG. 18 is an example of the stock addition interface of the invention.

When adding a stock, the administrator opens the appropriate page (generally described as 600 FIG. 18) and generally needs to provide the following stock information: symbol, stock title, description, tags, category, market maker settings, display value type and range, trading start and end dates/times, the business value, and the payout type. The Business Value is a text annotation to indicate the tangible value of the information to the organization.

Figure 19:
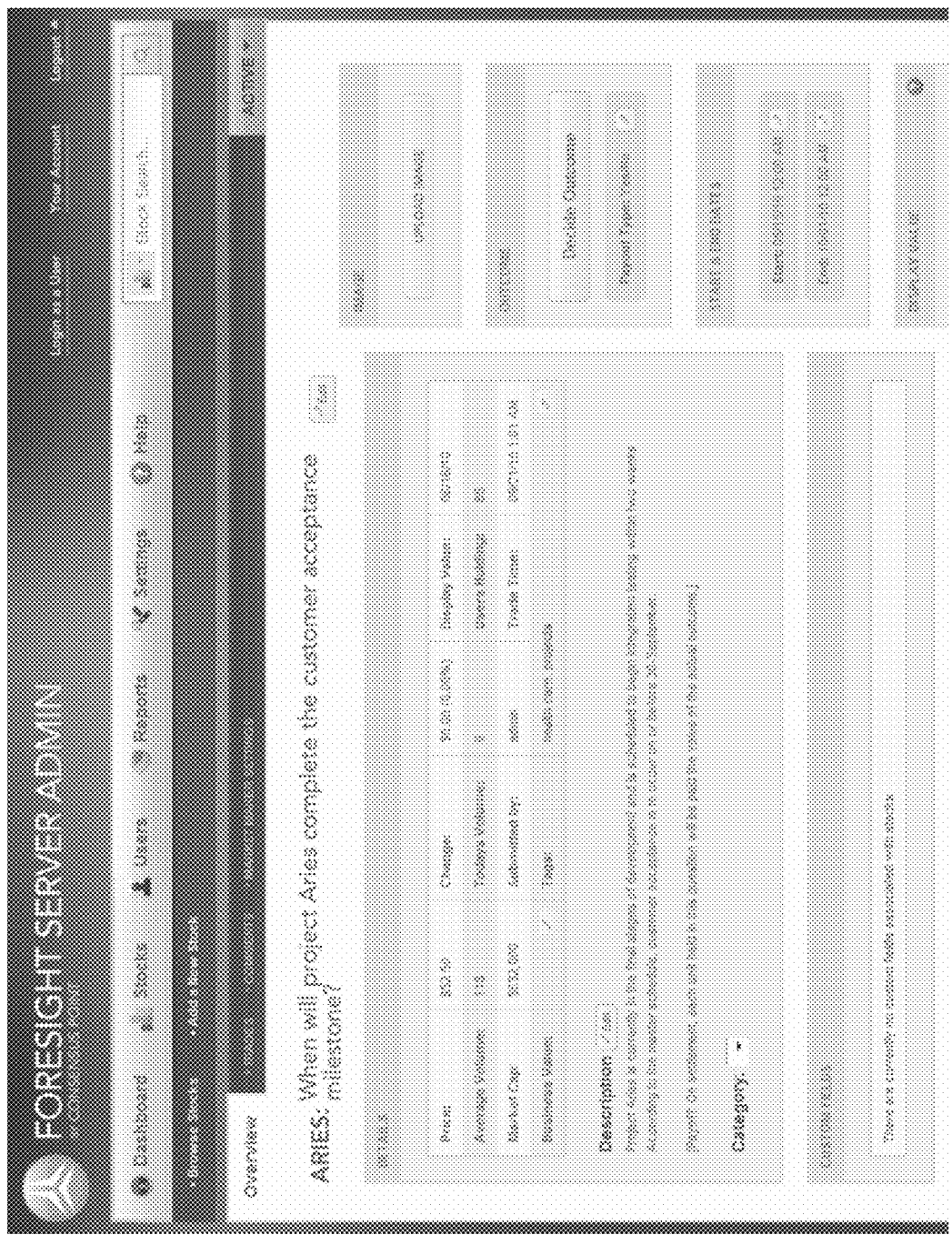
FIG. 19 is an example of an overview interface for a stock of the invention.

Each stock preferably has an overview page (generally described as 700 in FIG. 19). Included are relevant information such as price, average volume, market capitalization, price change, today's volume, submitting user, tags, display value, the number of users holding the stock, the last trade times, payout type, and start/end dates. Many of these fields are editable by the administrator. The interface also includes an outcome area, where the administrator can decide the outcome of the question/stock. Each stock also preferably has a trades pages, comments page, and market maker settings page (not shown).

Figure 20:
FIG. 20 is an example of a user summary interface of the invention.

The Users area gives a summary of all users (generally described as 800 in FIG. 20), preferably including their trading name, actual name, email, account creation date, and status.

Figure 21:
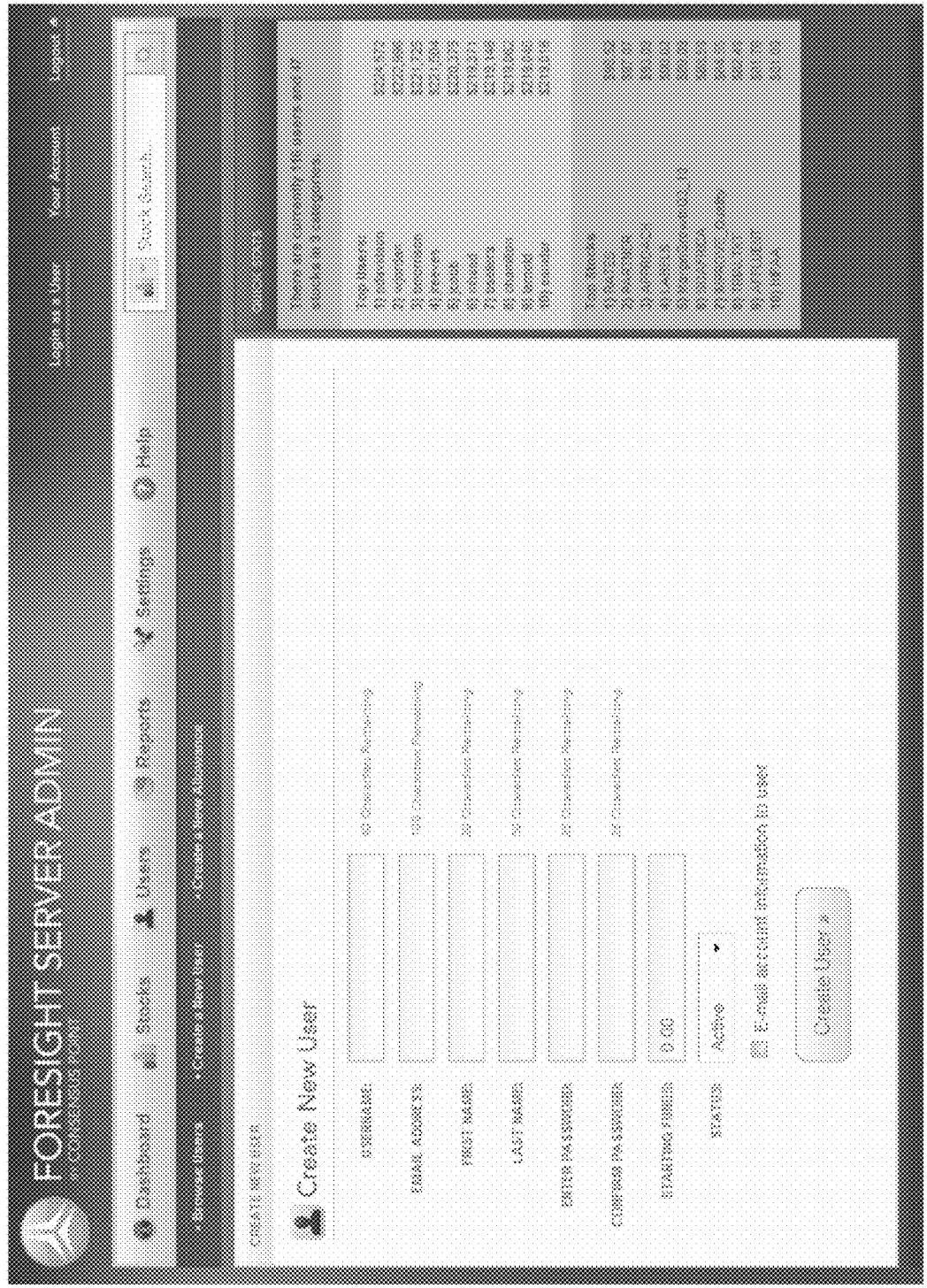
FIG. 21 is an example of a user addition interface of the invention.

New users can be created using a new user form (generally described as 900 in FIG. 21). In addition to the usual user account information (name, contact information, password, status), the administrator also assigns starting funds to a user.

Figure 22:
FIG. 22 is an example of an allowance creation form interface of the invention.

Once a user has been created, an allowance can be provided to the user. FIG. 22 shows an allowance creation form, generally described as 1000, which preferable include information including the allowance amount, start/end dates, distribution time, and periodicity (day of week, day of month).

Figure 23:
FIG. 23 is an example of an individual User Overview interface of the invention.

The Individual User Overview page provides the administrator a summary of the user's activity and holdings (generally described as 1100 in FIG. 23). More detailed information regarding trades, holdings and comments is preferably provided on other pages easily accessible from this area.

Decision Dashboard

Figure 24:
FIG. 24 is an example of a dashboard interface of the invention.

The present invention preferably includes a real-time dashboard providing overview of consensus and risk by category. As prediction markets evolve and become more effective management tools, having a comprehensive visualization of what is transpiring in the market at any given moment in time becomes very important. In the present invention platform, this is embodied in the enterprise dashboard (generally described as 1200 in FIG. 24). Available via the administrative portion of the system, the dashboard displays a wide range of relevant information on a single page. This includes the current consensus, a summarized 'Sparkline' chart which gives the user a very glanceable view of the recent trajectory in market prices, the change in market prices over the last 7/30/90 days, the number of days that a particular stock has been active, the date at which the stock will be settled, and the total number of comments that users have made about the stock.

All of the information contained in the dashboard enables decision makers to access the data they need, when they need it, in order to make judgment calls about the items that are put to the prediction market participants. Had this highly relevant information not been made available in a dashboard of this form, it is easy to imagine a scenario in which a leader might miss an opportunity to make a necessary decision at a critical time. Since the changing market prices reflect shifting confidences in the underlying questions in the market, leaders with access to this data are better prepared to take action in order to mitigate risks.

Figure 25:
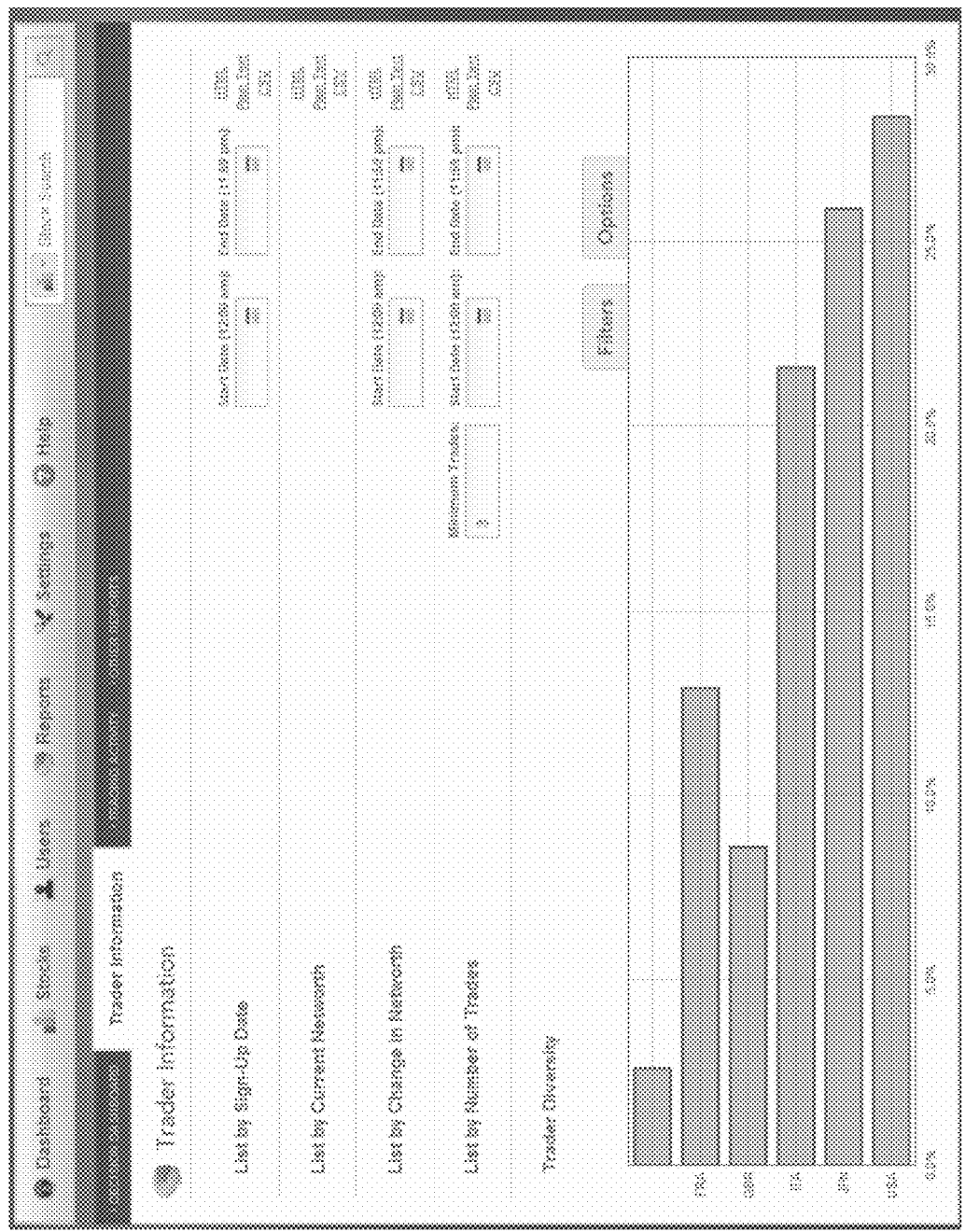
FIG. 25 is an example of a trader information report interface of the invention.

The present invention preferably includes other reports, including Trader Information, Trading Activity, and the like. FIG. 25 shows the Trader Information Report interface, generally described as 1300. Here the administrator can create reports that sort traders by various parameters, such as, for example, sign-up date, current net worth, change in net worth, number of trades, trader diversity, and the like. FIG. 25 shows a report wherein the traders have been graphed by nationality versus percentage of total population. The top bar represents unassigned users.

Figure 26:
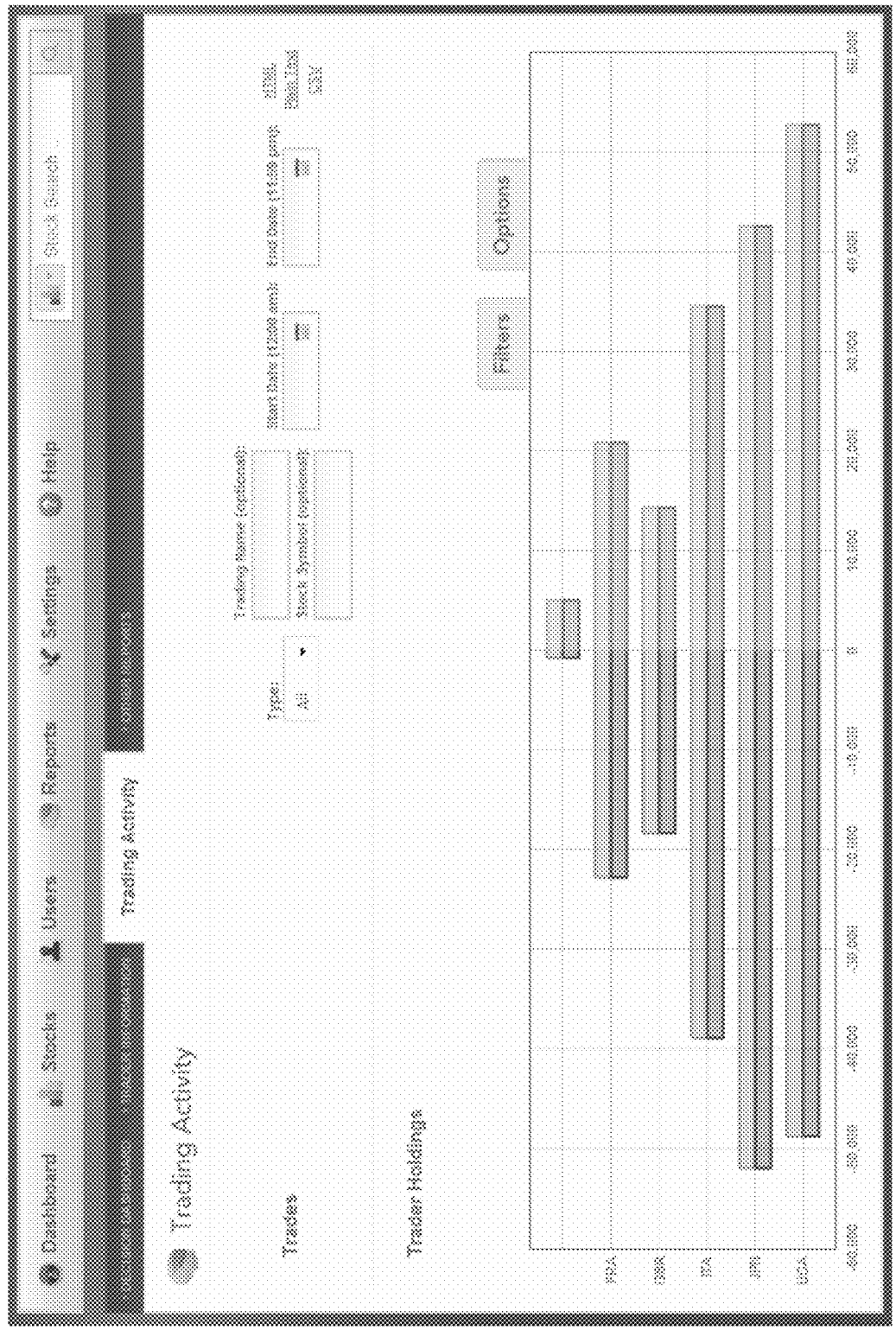
FIG. 26 is an example of a report interface of the invention.

Trading activity reports are also useful to administrators and are provided for in the present invention. Reports for different trading criteria include the types of trades, individual stock trades, start/end dates for trades, and the like. FIG. 26 shows a trading activity interface, generally described as 1400, showing a report wherein the trades have been graphed by nationality on the y-axis versus stock price on the x-axis. This type of report gives an indication of the propensity of a nationality to go long or short a stock.

Figure 27:
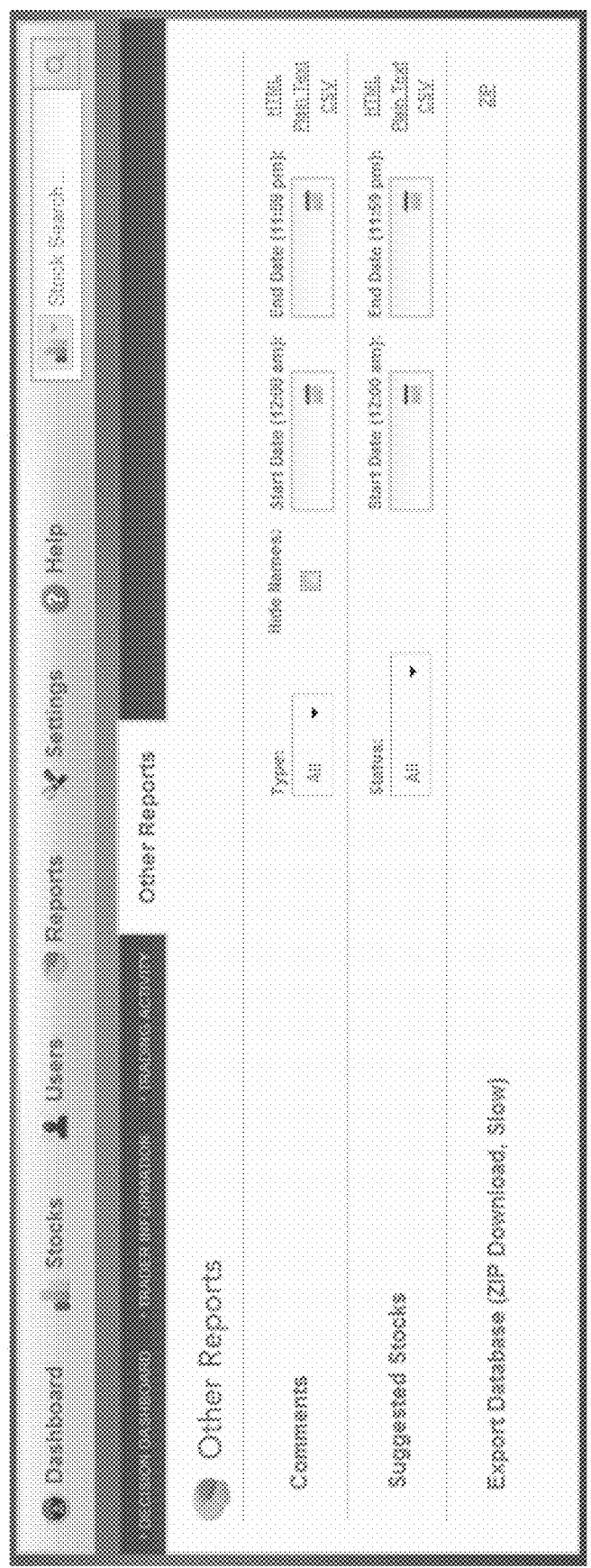
FIG. 27 is an example of a report generation interface of the invention.

Other reports provided for by the present invention include reports based on comment type, comment start/end dates, suggested stock status, suggested stock start/end dates, and the like. FIG. 27 shows an interface according to the present invention, generally described as 1500, for generating these types of reports.

Figure 28:
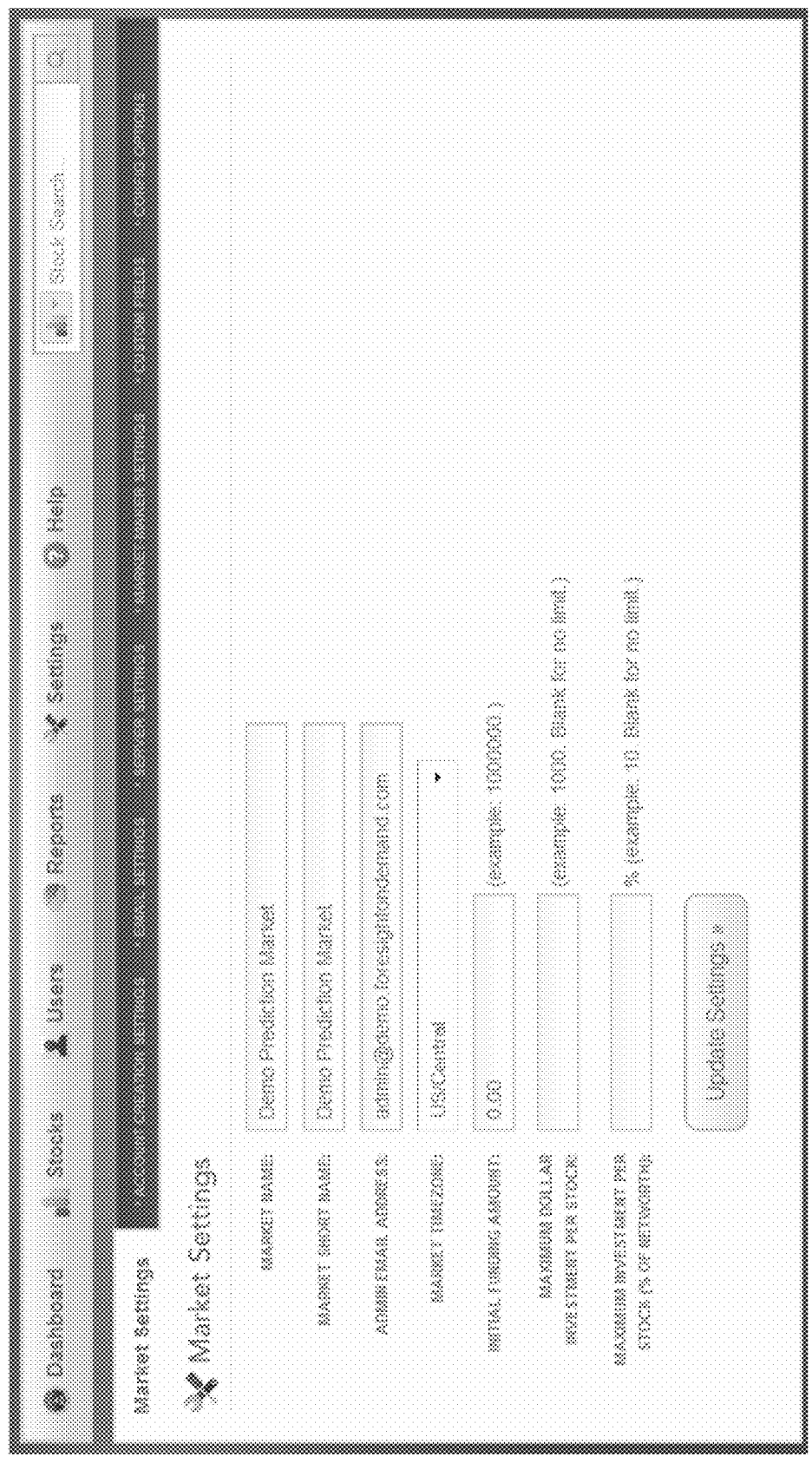
FIG. 28 is an example of a market settings interface of the invention.
Figure 29:
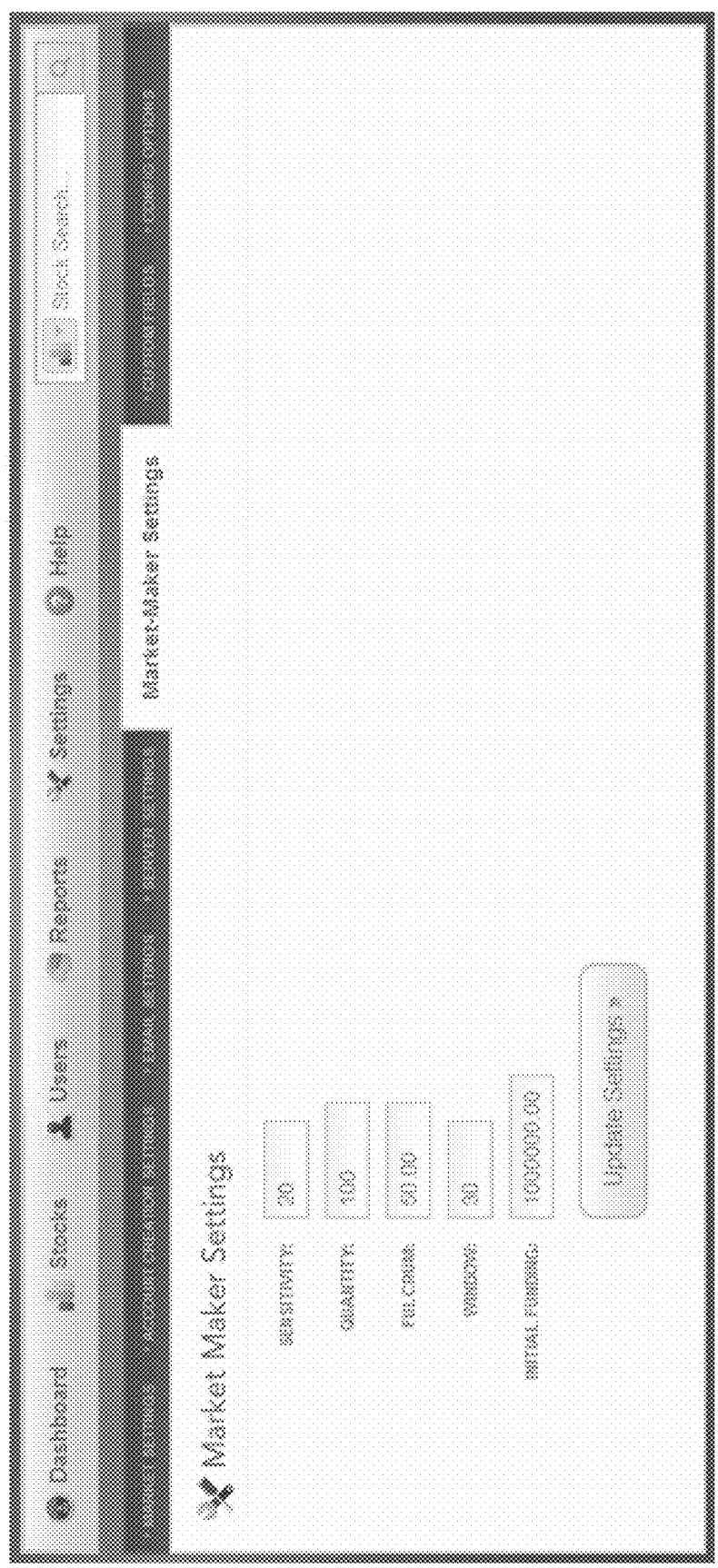
FIG. 29 is an example of a market maker settings interface of the invention.

The present invention preferably allows an administrator to administer multiple markets. Different markets can be created for specific purposes. Each market is configured by the administrator, including the market settings (generally shown as 1600 in FIG. 28), account creation settings, email settings, server settings, and market maker settings (generally described as 1700 in FIG. 29). The market maker setting includes the settings as previously described for the default settings. Furthermore, the market maker settings preferably include an initial funding setting.

In one embodiment of the present invention, the system includes a prediction market system operable (via software and/or applications directly or indirectly functioning) on a server computer having a processor, a memory, a power source, input/output devices, and at least one database in electronic, digital communication over a network, and connectable or accessible remotely through the network by at least one other remote computing device, which also has a processor, a memory, a power source, input/output devices, and constructed and configured for network-based digital communication over the network, wherein the prediction market system is operable for automatically performing prediction market transactions; the prediction market system interacting with a database of profile data for a multiplicity of users.

Additionally, the present invention includes a computer-readable code stored in a storage medium and executable by one or more processors, which when executed provides a prediction market system according to the present invention.

Figure 30:
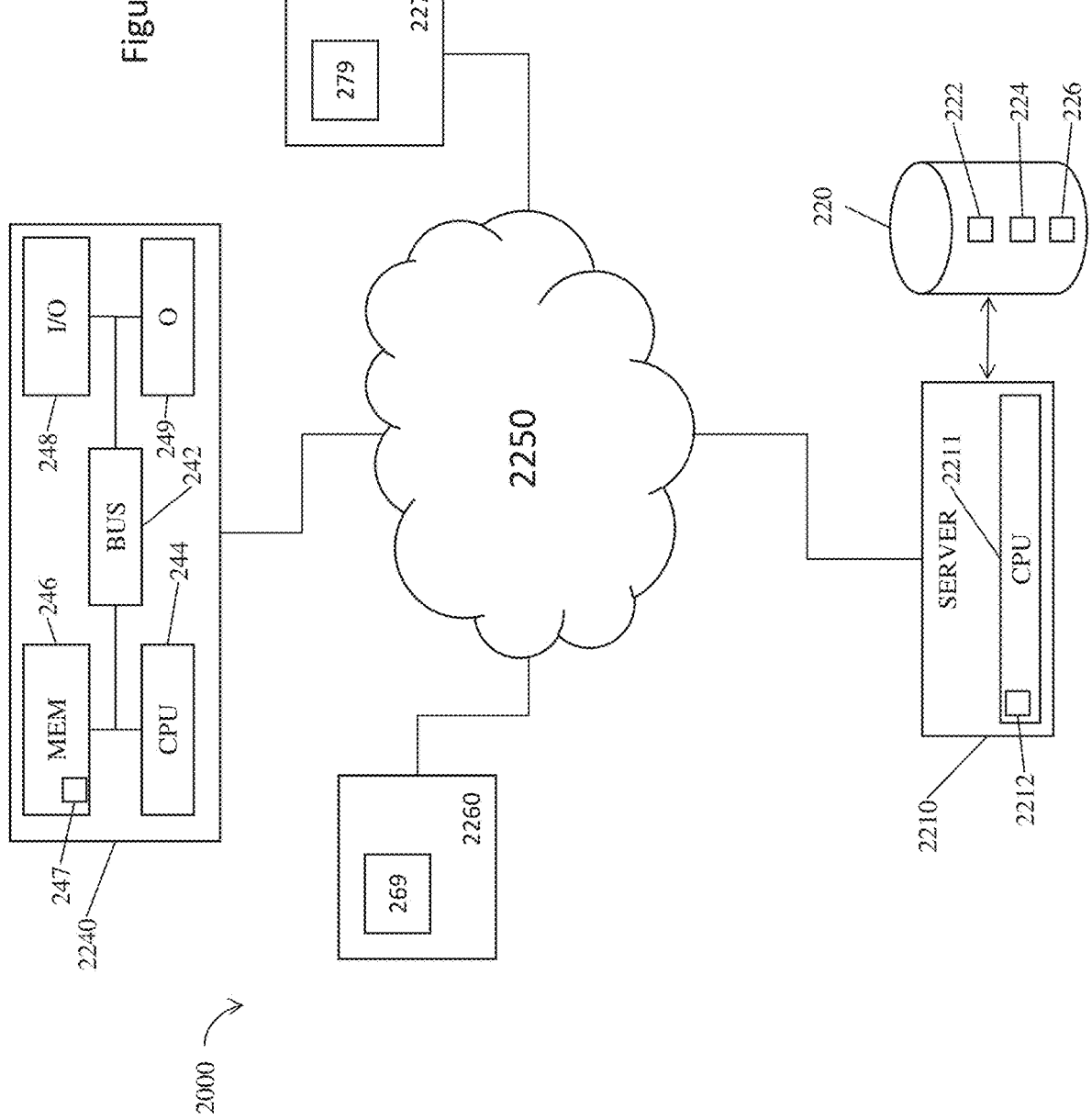
FIG. 30 is a schematic diagram of a networked system and remote server.

FIG. 30 is a schematic diagram of a networked system and remote server computer associated with the systems and methods of the present invention. As illustrated in FIG. 30, a basic schematic of some of the key components of the system including remote server computer and network access to the prediction market system, according to the present invention are shown. The system 2000 includes a server 2210 with a processing unit 2111. The server 2210 is constructed, configured and coupled to enable communication over a network 2250. The server provides for user interconnection with the server over the network using a personal computer (PC) 2240 positioned remotely from the server. Furthermore, the system is operable for a multiplicity of remote personal computers or terminals 2260, 2270. For example, in a client/server architecture, as shown. Alternatively, a user may interconnect through the network 2250 using a user device such as a personal digital assistant (PDA), mobile communication device, such as by way of example and not limitation, a mobile phone, a cell phone, smart phone, laptop computer, netbook, a terminal, or any other computing device suitable for network connection. Also, alternative architectures may be used instead of the client/server architecture. For example, a PC network, or other suitable architecture may be used. The network 2250 may be the Internet, an intranet, or any other network suitable for searching, obtaining, and/or using information and/or communications. The system of the present invention further includes an operating system 2212 installed and running on the server 2210, enabling server 2210 to communicate through network 2250 with the users thereof. The operating system may be any operating system known in the art that is suitable for network communication.

Figure 31:
FIG. 31 is a graphic user interface screen shot view according to an embodiment of the invention.

FIG. 31 shows a graphic user interface screen shot view according to an embodiment of the invention; more specifically, it illustrates a topic selection interface. FIG. 31 illustrates an embodiment of a market research style interface of the system and GUI. The interface or GUI 101 provides a number of regions that help inform and guide a user or virtual market participant to provide inputs and/or selections that create data that is used in an underlying or back end prediction market algorithm(s) and/or software operable on a server computer to provide useful market research results and information. The GUI includes a region 102 that shows statistical information for the user, including but not limited to net worth based on a number of "points" that the user has associated with his/her user profile, a user rank compared with other users, and the available points of the user for that interaction, and/or overall. The available points may be less than the net worth of the user if some of the points have already been committed to answers on topics or items that have not yet "closed" or completely concluded. The closing of an item or topic is determined by the company or entity that creates or poses the questions or topics for market research virtually via the server computer and GUI. The questions are provided to the server computer and associated with a company profile generated for and/or associated with the market research survey presented via the GUI. The questions usually have an associated time limit (e.g., number of days or other predetermined period of time) in which the company expects to receive enough data to provide a useful result, i.e., to receive outcomes that are statistically relevant and/or accurate for predictive value based upon a predetermined or minimum number of users providing inputs and/or selections for answers for questions. In some cases, the constraint on the question or topic may be time-based, or it may be based on a threshold number of users answering one or more questions (volume-based), or a combination of time-based and volume-based. The GUI illustrated in FIG. 31 further includes a number of tabs allowing the user to select actions and activities. The Topics tab 103, shown as active in the example of FIG. 31, presents a number of topics such as topic 109 to the user. The user is free to select or indicate any topic and to answer any number of the questions associated with a chosen topic, based upon the user's interest and confidence in the user's answer, i.e., in preferred embodiments, the GUI does not require that all questions are answered by each user to complete the market research survey. This important feature and functionality of the present invention systems, methods, and GUI increases the self-selecting nature of the participants in the system, which allows a group of users in the system to be self-selected automatically. This contrasts significantly with prior art market research, wherein consumer marketing firms typically select the market research survey users or participants from their own contacts and/or efforts to identify qualified users for each survey, based upon the requirements, type of questions, etc. that are provided by the company.

FIG. 31 also illustrates the GUI providing selection options for the user including My Answers 104, How to Play 105, and other tabs as required. For each topic, a summary question 106 of the topic is provided, along with the current number of users 107 answering the question and the score 108 of the question. The score represents the overall likelihood of a Yes answer to the question, which is positive. In this example, the score of 42.24 means that there is a corresponding 42.24 percent likelihood that the product will be successful based upon that question. The score is provided on a scale of 0-100 in a preferred embodiment of the present invention. The score for each question may be considered individually, or aggregated over all questions associated with a predetermined product or service to generate an aggregated result across questions and across users. In one embodiment, the system may provide a visual representation of the score shown by a green (rising) or red (falling) indicator, and/or a green or red number below the score to show the amount of change over some period of time (for example but not as a limitation, within one day). FIG. 31 further includes a GUI having a "ticker" 110 that shows the value of other topics. This ticker may be limited to displaying only those items in which a user has a position; alternatively, it may include all open items in the system, or items with recent updates. When a user selects a topic and click selects "Answer" in the interface of FIG. 31, the GUI automatically presents the user with another GUI illustrated in FIG. 32. In one embodiment of the system, this second GUI or interface is used to provide additional information about the topic so that the user can make a more informed answer to the topic question or concept.

FIG. 32 shows another graphic user interface screen shot view on a display associated with a computer device usable by a user or virtual market participant according to an embodiment of the invention; more specifically, it illustrates a topic selection interface. The topic Question 201 defines the topic in the GUI. The question 201 may include a picture of the product and/or service, and a description 203 that provides additional information. Region 202 is a comments section where the user can see comments about the topic from other users and even post a comment themselves. The GUI presents the user with a simple choice of Yes 204 or No 205 below the question 201 and description 205. If the user chooses to answer the question, then the server computer receives the Yes response and automatically presents the user with another GUI or interface screen, which is illustrated by FIG. 3. Optionally, this GUI may be viewable when the presentation of the choice or question and answer about continuing to answer the question, and/or when the topic selection is indicated by the user via the GUI and received by the remote server computer. The interface indicates a region 301 in which the GUI presents the user with a confidence indicator, wherein inputs may be received from the user via the GUI in a numerical format, e.g., percent confidence, level of confidence on a scale of 0-100 or another scale, etc. and/or in an interactive visual indication, such as with a slider mechanism wherein moving from a first position to a second position in any direction indicates more or less confidence, e.g., positive to negative, or on a scale, etc. The confidence may be further indicated using the number of points for that user that the user wishes to play or to bid on the topic; on the back end, which is not visible to the user via the GUI, the confidence using the number of points correlates to predictive market applications for the analytics by the server. A higher number of points corresponds to higher confidence by the user. This is referred to as a Confidence Field, wherein the GUI receives information or inputs by the user indicating the user's confidence in the user's answer by allocating or "betting" points on the outcome, i.e., that the overall outcome for that question will be the same as the user's inputs. If the user is very confident in the answer, then more points will be indicated, or at risk of loss. If at the end of a predetermined period of the presentation of the topic on the GUI by the system, more payout points may be awarded to that user's profile or points total based upon the user's confidence, wherein the payout points are automatically determined by the remote server computer based upon the prediction market software operating thereon. A strongly confident "No" 205 answer is automatically transformed by the server computer and the predictive market back end into a short sell of stock, inasmuch as the user is predicting that the topic will not be successful and the score will drop or decrease. A strongly confident "Yes" 204 answer is a prediction that the score will rise or increase. The relative strength of the "Yes" or "No" answer or input by the user is based upon the Confidence inputs and/or indications by the user (i.e., higher points allocated and/or "bet" indicates a stronger confidence than less points) and/or are directly selectively noted in the GUI as "strong Yes" or "strong No". Once the user has provided the Confidence number 301 or input, the user can then select Submit 302 on the GUI to enter the answer into the system.

FIG. 33 shows another graphic user interface screen shot view according to an embodiment of the invention; more specifically, it illustrates an interface for answering a question and entering a confidence amount. The amount of confidence points that are entered by the user in connection with the answer represents a "purchase" of units of that topic, based upon the current confidence score. For example, as set forth earlier, a confidence score of 42.24 was provided. If the user entered 2500 confidence points in the Yes answer, the user would automatically receive a predetermined number of units, e.g., 35.5 units, for "spend" or "bet" on that topic applied to the user profile. If the user's answer correctly predicts the outcome automatically generated by the system based upon all answers received and considered, then the system automatically allocates additional points, e.g., 100 points, for each unit owned, or in this case, 3550 points. In some cases, the question is such that a binary answer is not provided or allowed, or that the question is restricted to have answers receivable only as non-binary answers. Also, in some cases, the question is such that a Yes or No answer will not be known for some time, perhaps indefinitely. In those cases, the system defines a close-out time or completion time for the topic or question, and payoffs are made or allocated to users based upon the confidence score at the time of closing. For example, if a user purchased at a confidence score of 60 and the topic or question closed at 70, the user is allocated 10 points per share. Similarly, a lower confidence score represents a loss of points. Although this example is explained with the term "shares" the user is not necessarily made aware of the shares algorithms associated with the stock market prediction market model, i.e., the user is not aware of the share transactions that occur automatically by the server computer for the virtual market based upon the answers received from the GUI user inputs or answers. To the user, a survey type interface is presented in a novel and unique way that provides meaningful data to the underlying prediction market algorithm(s) that transform the user input data to provide useful market research results automatically.

In one embodiment of the present invention, the system presents a query to the user via the GUI "Tell us why you answered in this manner". This provides additional market research data in addition to the prediction market type information automatically generated by the system and remote server computer. An advantage of the systems and methods of the present invention is the combination market research survey and prediction market that is presented through the GUI to the user in such a manner to eliminate complexity and confusion for the user by masking the prediction market on the back end, i.e., the GUI appears to be traditional market research, although the inputs and selections of the users entered via the GUI are transformed by the prediction market back end operable on the server, so that the user does not have awareness of the back end operations. Thus, the company generating the topic can simply generate questions that are simple and useful in eliciting answers by users via the GUI, and self-selecting users respond to the topic questions because they have self-identified via user profiles matching the topic and/or by themselves selecting the topic and/or questions to answer based upon interest, not based upon required answers to be provided or inputted for every question on a survey, as with prior art. This is a significant advantage of the present invention.

Figure 34:
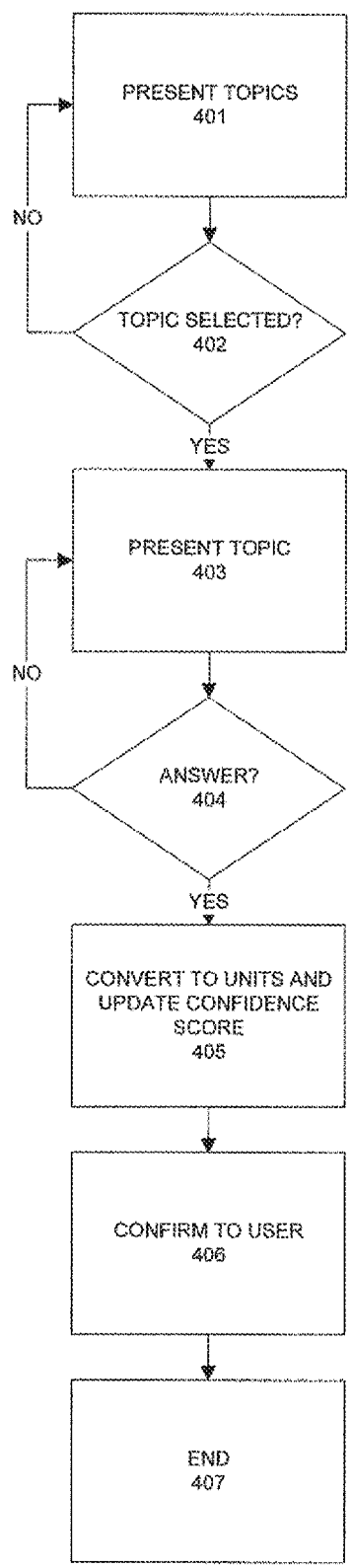
FIG. 34 is a flow diagram illustrating method steps used with an embodiment of the invention.

FIG. 34 shows a flow diagram illustrating method steps used with an embodiment of the invention. At step 401 the user is presented with a plurality of topics as indicated in FIG. 31. At decision block 402 it is determined if the user has selected a topic. If not, the system returns to step 401. If yes, then the system proceeds to step 403 and automatically presents the selected topic as with FIG. 32. At step 404 the system determines if the user has provided inputs and/or selections for answers, and provided a confidence level corresponding thereto. If not, the system returns to step 403. If so, the system automatically translates the user's answer into share units and updates the score for the topic and the user account or user profile at step 405.

Step 406 provides the system automatically confirming the answer and confidence score to the user, and ends at step 407. The use of combined prediction market and market research survey system with a market research style GUI or interface provides unique information that would otherwise not be available with prior art. The method of reporting results to the user and/or to the company providing the questions to be answered is also unique to the present invention.

FIG. 35 is another graphic user interface screen shot view according to an embodiment of the invention; more specifically, it illustrates a spread analysis interface for a topic and set of questions. At region 501 the user selects which topics to answer.

Region 502 shows all questions associated with the topic. Region 503 shows the spread analysis for each question. This shows the points that have been invested in each question, and the passion and intensity of responses, including the confidence level indication by the users (illustrated on the x-axis). For example, the question related to whether current TV owners would switch to the project had very little activity as shown by bar 505. By contrast, bar 504 shows that this question had the most investment and it was all positive. The bar 506 shows there was significant activity but the majority of it was negative. The reporting provided by the systems and methods of the present invention show overall preferences to a particular question based upon aggregation of all user inputs along with confidence scores, so that merely the number of participants that prefer an outcome is not necessarily dispositive of the answer, i.e., the combination of the answer and the confidence level is transformed by the system to generate the outcome, rather than simply considering the number of answers. In other words, the answers are weighted by their confidence scores and these weighted answers are used to give an aggregate answer. This is particularly valuable and importantly associated with non-binary answers to the questions.

FIG. 36 shows another embodiment of the GUI for selecting questions.

Figure 37:
FIG. 37 is another graphic user interface screen shot view according to an embodiment of the invention.

FIG. 37 shows another embodiment of the GUI for answering a question and submitting comments.

FIG. 38 shows another embodiment of the GUI for tracking answers and performance.

Thus, the present invention provides for a prediction market system, the system including: a computer system including a server computer and at least one database in electronic, digital communication over a network, connectable or accessible remotely through the network by at least one other remote computing device, the server running a software providing: an automated market maker; a liquidity management system with administrative controls for the market maker for sensitivity, quantity, fulcrum and window in order to provide enough liquidity so that about all answers receive investment by investors who are potentially informed enough to make an investment, but not so much that investors can invest beyond their informed ability; an investment transaction interface, wherein the investment transaction interface is a slider interface with a slider that the user uses to choose the amount of money to invest and the interface calculates the amount of stock the user is to receive or sell; thereby providing a prediction market system that is intuitive and gives good predictions.

The automated market maker preferably creates liquidity in the system by providing ongoing buy and sell orders that are logarithmically spaced in a price ladder. The automated market maker can also provide for double auction by incorporating limit orders. The automated market maker preferably has the sensitivity setting at about 20; the quantity at about 100; the fulcrum at about 50.00 and the window at about 30.

The investment transaction interface permits buying and selling shares with the same slider in a single action. The payout is either binary or variable. The stocks are grouped and can be linked.

The present invention further includes a computer-readable code stored in a storage medium and executable by one or more processors, which when executed provides a prediction market system that includes: an automated market maker; a liquidity management system with administrative controls for the market maker for sensitivity, quantity, fulcrum and window, in order to provide enough liquidity so that so that about all answers receive investment by investors who are potentially informed enough to make an investment, but not so much that investors can invest beyond their informed ability; an investment transaction interface, wherein the investment transaction interface is a slider interface with a slider that the user uses to choose the amount of money to invest and the interface calculates the amount of stock the user is to receive or sell; thereby providing a prediction market system that is intuitive and gives good predictions.

The present invention further includes a computer-readable code stored in a storage medium and executable by one or more processors, which when executed provides an investment transaction interface for an electronic stock and commodities exchange, the interface including a slider for choosing the amount of money to invest or divest and wherein the interface displays the amount of stock the user is to receive or sell.

The investment transaction interface preferably permits buying and selling shares with the same slider in a single action. The investment transaction interface can also permit the buying and selling of shares and/or options with the same slider in a single action.

Currently, a large amount of volumetric forecasting is performed using consumer survey results. This approach is inaccurate for several reasons. Principal among these is that consumers are more likely to provide positive responses to the question of whether they will buy a product or service if no purchase is actually necessary. This causes results to be falsely inflated, and leads to higher volumetric production than necessary.

An improved approach to volumetric forecasting utilizes prediction markets. U.S. patent application Ser. Nos. 14/066,344, 13/278,424, and 14/142,327, each of which is incorporated in the present application by reference, provide improved prediction markets. One way these applications provide for improved prediction markets is in that the consumer is asked about predictions as opposed to opinions. The consumer is also allotted points to weight predictions, and can provide reasoning for predictions. The presence of one or more of these elements provides for improved prediction markets. When these improved prediction markets are utilized in volumetric forecasting in place of consumer surveys, more accurate volumetric forecast results are generated.

A further improvement upon prediction markets utilized in the context of volumetric forecasting is found in adjusting the points or the starting value of the test concept. Current prediction market procedures begin each test concept with 50 points. However, using 50 points as the starting point can produce inaccurate results for volumetric forecasting. These forecast results are typically too high, with the worst forecast in a group of test concepts being +27% as the results are based on an inflated chance of success, but also can be too low, as the best forecast in the group test concepts was −4%.

In one embodiment, the present invention provides improved volumetric forecasting by adjusting the points or the starting value of the test concept. As one of ordinary skill in the art would understand, any volumetric forecasting system or method is applicable with the methods and systems of the present invention. In one embodiment, the Fourt Woodlock volumetric forecasting model is used with the methods and systems of the present invention. In one embodiment, the present invention provides starting values or points of 5 points, 10 points, 15 points, 20 points, 25 points, 30 points, 35 points, 40 points, and/or 45 points for the prediction market. Most preferably, the present invention provides starting values or points of 10 points, 15 points, and/or 20 points in the prediction market. However, the starting values or points of the present invention can be any number of points between 5 points and 45 points, including about 5 points, about 6 points, about 7 points, about 8 points, about 9 points, about 10 points, about 11 points, about 12 points, about 13 points, about 14 points, about 15 points, about 16 points, about 17 points, about 18 points, about 19 points, about 20 points, about 21 points, about 22 points, about 23 points, about 24 points, about 25 points, about 26 points, about 27 points, about 28 points, about 29 points, about 30 points, about 31 points, about 32 points, about 33 points, about 34 points, about 35 points, about 36 points, about 37 points, about 38 points, about 39 points, about 40 points, about 41 points, about 42 points, about 43 points, about 44 points, and about 45 points in the prediction market.

Notably, the worst forecast was −3% and the best forecast was +2% when utilizing a 20 points starting value in the group of test concepts. In one embodiment, the worst forecast and the best forecast refer to how close the unit sales resulting from the starting value is to the actual theoretical trial of the new test concept(s) or new product(s) in the market. When using a 15 points starting value in the group of test concepts, the worst forecast was −4% and the best forecast was +2%. When using a 10 points starting value in the group of test concepts, the worst forecast was −10% and the best forecast was −3%. In this particular group of test concepts, using starting values lower than 10 points or higher than 20 points worsened the forecast significantly. For instance, using a starting point of 5 points provided a worst forecast of −18% and a best forecast of −5%. Using a starting point of 1 point provided a worst forecast of −26% and a best forecast of −6%.

This suggests that using starting values more closely aligned with market conditions seems to provide significant improvements in forecasting and predictability. In one embodiment, the starting value is determined by the number of competing brands or competing products in the market. In one embodiment, the starting value is determined by the formula (1/N)*100=SP, wherein N is the number of competing brands or competing products in the market and SP is the starting point. For example, if there are 20 brands in a test category, the starting point should be (1/20)*100=5 points. In one embodiment, the starting point can be weighted based upon the brand leader or more than one brand leader. In another embodiment, the starting point can be weighted based upon a high barrier to entry or a low barrier to entry into the market. In another embodiment, the starting point can be weighted upon a monopoly, such as that granted by a patent or by a contract or a government entity.

Notably, the starting values are dependent upon the category of product or service. Different categories of products and services will have a different sensitivity of the starting point. For example, cereals or snacks will more than likely have a different starting value or starting value range than personal health products such as bandages.

One embodiment of the present invention provides for utilizing the prediction markets described in U.S. Pat. No. 8,612,331 in conjunction with the starting points and volumetric forecasting described in the present application. However, it should be understood that the starting points described in the present application are not limited to being utilized in conjunction with the prediction markets described in U.S. Pat. No. 8,612,331. In particular, the starting points and volumetric forecasting described in the present application can also be used with combinatorial markets which allow multiple predictions and measure the relationships between all prediction questions and internal and external conditions (ex: "if X, then Y" scenario planning).

Another embodiment of the present invention provides for evaluating at least one concept monadically through consumer surveys, the consumers entering the prediction market, and forecasting volume. Concepts are preferably chosen from purchase interest, relevance, uniqueness, believability, likeability, advantages, and price/value.

Another embodiment of the present invention provides for consumers entering the prediction market, then evaluating at least one concept and then forecasting volume. Concepts are preferably chosen from purchase interest, relevance, uniqueness, believability, likeability, advantages, and price/value.

Another embodiment of the present invention provides for the forecasting of future trends. The resulting information is useful in analyzing brands, categories, human behaviors, consumer trends, shopper trends, markets, and other industry trends, such as growth of specific new markets. Findings are later verified by comparing with known market research in order to validate the forecasting system. Traditional forecasting methods ask specific questions about a product, person, date, and user responses to survey questions are generally rooted in past information. Future trends forecasting relies on survey respondents placing a stake in their opinion about the future, and they self-select for having knowledge regarding the relevant subject.

This embodiment further differs from current forecasting methods because instead of using traditional ratings and ranking scales, which are often limited to a choosing an integer between one and five, or similar, in this method research participants are challenged to place a bet with a virtual currency or other virtual measure of value on the answers to trends they think are correct, and further defend their answers. As a participant is more and more confident, either in the growth of a trend or its diminishment, they bet more, and their impact on the analysis of the trend is greater. As a result, this trend forecasting system can predict not only how something will change, but also the speed and size of the change as well. Effectively, the system captures the collective judgment of a community or target audience to predict future trends, evaluate early-stage ideas and concepts, and optimize marketing and brand communications efforts. In one embodiment, they pose further questions regarding the trend or industry in order to stimulate further analysis by other participants.

In one embodiment, this system for the forecasting of trends utilizes an algorithm to set the stock prices that a user will see when they place their bet on a particular industry or trend. The algorithm is based on the logarithmic mean scoring rule. In a preferred embodiment, the system further utilizes machine learning to set the stock prices that a user will see when they place their bet on a particular industry or trend. The machine learning is taught by each user response to a question and then adjusts a baseline stock price for the subsequent user, providing real-time updating and information not just to the user but also output to the customer who is seeking to understand the trend. U.S. Pat. Nos. 10,296,310 and 9,922,286, both of which are incorporated in the present application by reference, provide for an algorithm-based machine learning system.

The trend forecasting system has various outputs that are provided to a customer seeking to understand a trend. This output information helps marketers, executives, and other leaders to anticipate how fast and why trends, consumer needs, and brands will grow in a way that current forecasting methods cannot. A prediction likelihood index on all outcomes measured, such as the resulting data from each question asked to participants, and the qualitative rationale behind each resulting prediction are reported. In one embodiment, this data is represented as specific metrics. This includes: growth likelihood, including how a trend or industry will grow, how fast it will grow, and how big it will grow to be, specific segments and brands, including what companies or segments will lead the market, specific timing, including when events or trends are likely to happen, and specific rationale, including why a specific trend may occur. In another embodiment, the data is reported as a likelihood of a trend or event, broken up into at least two zones, where a trend or event is either possible or not possible. In a preferred embodiment, the likelihood is broken up into four zones as follows, drawn as a bullseye, with the lowest likelihood as the outer ring and highest likelihood as the center. On the outside, event or trend not probable (less than 35% chance). Next, event or trend is possible (35% to 60% chance). Next, event or trend is plausible (61% to 85% chance). Finally, event or trend is probable (greater than 85% chance). In another embodiment, data may be presented regarding specific companies. For example, data may highlight specific brands to watch, brands of varying tenures. This includes identification of start-ups and emerging technologies that will grow and survive and as a result will re-shape the competitive landscape. Further, this includes how fast the companies or technologies will grow, and which existing companies will be impacted most by the growth. This data is also used to assess the risk of a specific competitor reaching the market first, or to determine which companies or brands benefit most by taking the lead in a market. These metrics provide simple, quick and to the point information that can be easily digested by a customer looking to understand a specific industry or grow their business.

Certain modifications and improvements will occur to those skilled in the art upon a reading of the foregoing description. For example, while each of these functions is described on an interface, many of the functions can be moved to another interface or to a new interface. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A prediction market apparatus comprising:
a computer including a processor and a memory running
a software providing:
a transaction interface;
administrative controls operable to provide for adjustment of a market fulcrum; and
a forecasting system;
wherein the software calculates and displays in the transaction interface a quantity of stock, currency, points, or tokens or the value of stock, currency, points, or tokens associated with single action; and
wherein the forecasting system is operable to determine a forecast based on the single action and the quantity of stock, currency, points, or tokens or the value of stock, currency, points, or tokens.

2. The apparatus of claim 1, wherein the value of stock, currency, points, or tokens is determined based on a logarithmically spaced price ladder for the stock, currency, points, or tokens, wherein the software is operable to automatically update the logarithmically spaced price ladder for the stocks, currency, points, or tokens based on the single action involving the quantity of stock, currency, points, or tokens or the value of stock, currency, points, or tokens.

3. The apparatus of claim 1, wherein the administrative controls provide for selective adjustment of sensitivity.

4. The apparatus of claim 1, wherein the administrative controls provide for selective adjustment of liquidity.

5. The apparatus of claim 1, wherein the administrative controls provide for selective adjustment of window.

6. The apparatus of claim 1, wherein a starting point for the quantity of stock, currency, points, or tokens or the value of stock, currency, points, or tokens associated with the single action is pre-defined.

7. The apparatus of claim 1, wherein the forecasting system includes a machine learning algorithm operable to transform a set of actions including the single action involving the quantity of stock, currency, points, or tokens or the value of stock, currency, points, or tokens into predictive data.

8. The apparatus of claim 1, wherein the forecast includes a rationale for a trend, wherein the rationale for the trend is determined utilizing a machine learning algorithm, and wherein the forecast is updated based on a subsequent action received through the transaction interface.

9. The apparatus of claim 1, wherein the forecast includes a growth likelihood, a segment or a brand, a timing, or a rationale for a trend, wherein the growth likelihood, the segment or the brand, the timing, or the rationale for the trend is calculated by the machine learning algorithm, and wherein the forecast is updated based on a subsequent action received through the transaction interface.

10. A prediction market apparatus comprising:
a computer including a processor and a memory running
a software providing:
a transaction interface;
administrative controls operable to provide for adjustment of a market fulcrum; and
a forecasting system;
wherein the software calculates and displays in the transaction interface a quantity of stock, currency, points, or tokens or the value of stock, currency, points, or tokens;
wherein the transaction interface further includes an interface permitting buying or selling the quantity of stock, currency, points, or tokens or the value of stock, currency, points, or tokens with a single action;

wherein the software is operable to determine a forecast based on a single action and the quantity of stock, currency, points, or tokens or the value of stock, currency, points, or tokens; and wherein the forecasting system is operable to determine a forecast based the quantity of stock, currency, points, or tokens or the value of stock, currency, points, or tokens.

11. The apparatus of claim 10, wherein the value of stock, currency, points, or tokens is determined based on a logarithmically spaced price ladder for the stock, currency, points, or tokens, wherein the software is operable to automatically update the logarithmically spaced price ladder for the stocks, currency, points, or tokens based on the quantity of stock, currency, points, or tokens or the value of stock, currency, points, or tokens.

12. The apparatus of claim 10, wherein administrative controls provide for selective adjustment of sensitivity.

13. The apparatus of claim 10, wherein administrative controls provide for selective adjustment of liquidity.

14. The apparatus of claim 10, wherein administrative controls provide for selective adjustment of window.

15. The apparatus of claim 10, wherein a starting point for the quantity of stock, currency, points, or tokens or the value of stock, currency, points, or tokens is pre-defined.

16. The apparatus of claim 10, wherein the forecasting system includes a machine learning algorithm operable to transform a set of actions involving the quantity of stock, currency, points, or tokens or the value of stock, currency, points, or tokens into predictive data.

17. The apparatus of claim 10, wherein the forecast includes a rationale for a trend, wherein the rationale for the trend is determined utilizing a machine learning algorithm, and wherein the forecast is updated based on a subsequent action received through the transaction interface.

18. The apparatus of claim 10, wherein the forecast includes a growth likelihood, a segment or a brand, a timing, or a rationale for a trend, wherein the growth likelihood, the segment or the brand, the timing, or the rationale for the trend is calculated by the machine learning algorithm, and wherein the forecast is updated based on a subsequent action received through the transaction interface.

19. A prediction market apparatus comprising:
a computer including a processor and a memory running a software providing:
a market maker; and
a transaction interface; and
administrative controls operable to provide for adjustment of a market fulcrum;
wherein the market maker calculates and displays in the transaction interface a quantity of stock, currency, points, or tokens or the value of stock, currency, points, or tokens;
wherein the market maker is operable to determine a forecast based on a single action and the quantity of stock, currency, points, or tokens or the value of stock, currency, points, or tokens; and
wherein the transaction interface further includes an interface permitting buying or selling the quantity of stock, currency, points, or tokens or the value of stock, currency, points, or tokens.

20. The apparatus of claim 19, wherein administrative controls provide for selective adjustment of sensitivity, window, and liquidity.

* * * * *